(12) United States Patent
Kim et al.

(10) Patent No.: US 9,948,378 B2
(45) Date of Patent: Apr. 17, 2018

(54) METHOD AND DEVICE FOR TRANSMITTING REFERENCE SIGNAL IN MULTI-ANTENNA SUPPORTING WIRELESS COMMUNICATION SYSTEM

(71) Applicant: LG ELECTRONICS INC., Seoul (KR)

(72) Inventors: Youngtae Kim, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 46 days.

(21) Appl. No.: 15/121,925

(22) PCT Filed: Mar. 10, 2015

(86) PCT No.: PCT/KR2015/002284
§ 371 (c)(1),
(2) Date: Aug. 26, 2016

(87) PCT Pub. No.: WO2015/137690
PCT Pub. Date: Sep. 17, 2015

(65) Prior Publication Data
US 2017/0070276 A1    Mar. 9, 2017

Related U.S. Application Data

(60) Provisional application No. 61/951,549, filed on Mar. 12, 2014.

(51) Int. Cl.
*H04B 7/06* (2006.01)
*H04W 72/04* (2009.01)
(Continued)

(52) U.S. Cl.
CPC ......... *H04B 7/0626* (2013.01); *H04B 7/0413* (2013.01); *H04L 5/0023* (2013.01);
(Continued)

(58) Field of Classification Search
None
See application file for complete search history.

(56) References Cited

U.S. PATENT DOCUMENTS

2013/0242773 A1   9/2013  Wernersson et al.
2013/0272151 A1*  10/2013  Thomas ................ H04W 24/02
                                                  370/252
(Continued)

FOREIGN PATENT DOCUMENTS

WO    WO 2012128446 A1 *  9/2012  ........... H04B 7/0634

OTHER PUBLICATIONS

PCT International Application No. PCT/KR2015/002284, Written Opinion of the International Searching Authority dated Jun. 10, 2015, 18 pages.

*Primary Examiner* — Faruk Hamza
*Assistant Examiner* — Cassandra Decker
(74) *Attorney, Agent, or Firm* — Lee, Hong, Degerman, Kang & Waimey PC

(57) ABSTRACT

The present invention relates to a method and a device for estimating a channel of a terminal in a wireless communication system that supports multiple antennas. Particularly, the method comprises the steps of receiving a channel state information-reference signal (CSI-RS) for a plurality of first domain antennas and a cell-specific reference signal (CRS) for a plurality of second domain antennas, and estimating the all of the channels on the basis of a first channel for the first domain antennas estimated from the CSI-RS and a second channel for the second domain antennas estimated from the CRS.

9 Claims, 27 Drawing Sheets

(51) Int. Cl.
   *H04L 5/00* (2006.01)
   *H04B 7/04* (2017.01)
   *H04W 84/04* (2009.01)
   *H04B 7/0413* (2017.01)

(52) U.S. Cl.
   CPC ......... *H04L 5/0048* (2013.01); *H04W 72/042* (2013.01); *H04W 72/0413* (2013.01); *H04W 84/042* (2013.01)

(56) References Cited

U.S. PATENT DOCUMENTS

| | | | |
|---|---|---|---|
| 2013/0308714 A1 | 11/2013 | Xu et al. | |
| 2013/0308715 A1 | 11/2013 | Nam et al. | |
| 2013/0329664 A1* | 12/2013 | Kim | H04W 24/10 370/329 |
| 2014/0010321 A1* | 1/2014 | Kang | H04B 7/0634 375/267 |
| 2014/0016549 A1 | 1/2014 | Novlan et al. | |
| 2015/0043439 A1* | 2/2015 | Sajadieh | H04L 5/14 370/329 |
| 2015/0222340 A1* | 8/2015 | Nagata | H04W 16/28 375/267 |
| 2015/0236801 A1* | 8/2015 | Sun | H04B 17/27 370/328 |
| 2015/0288497 A1* | 10/2015 | Li | H04B 7/0413 370/329 |

\* cited by examiner

FIG. 13
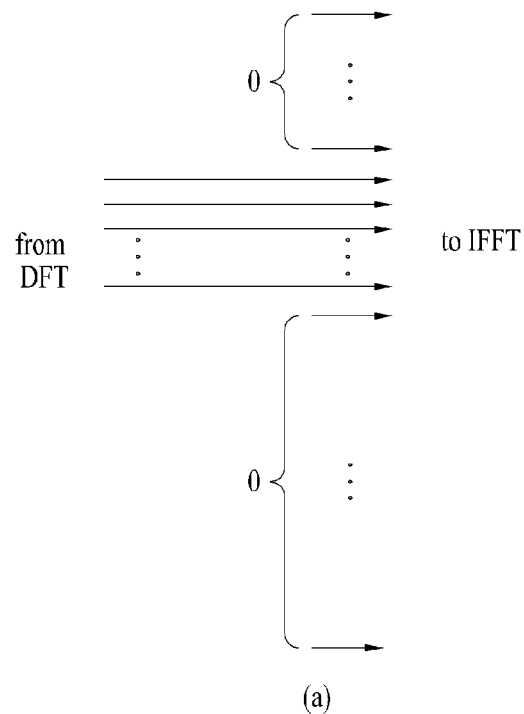
(a)
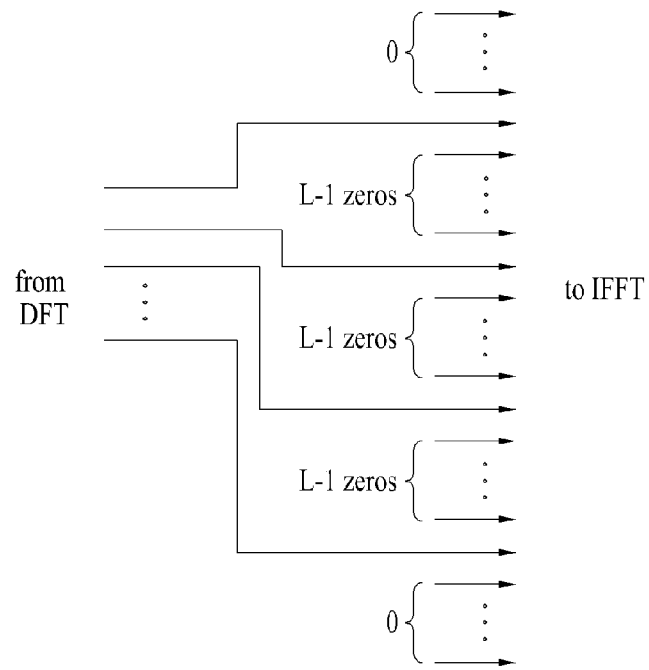
(b)

FIG. 15
Normal CP
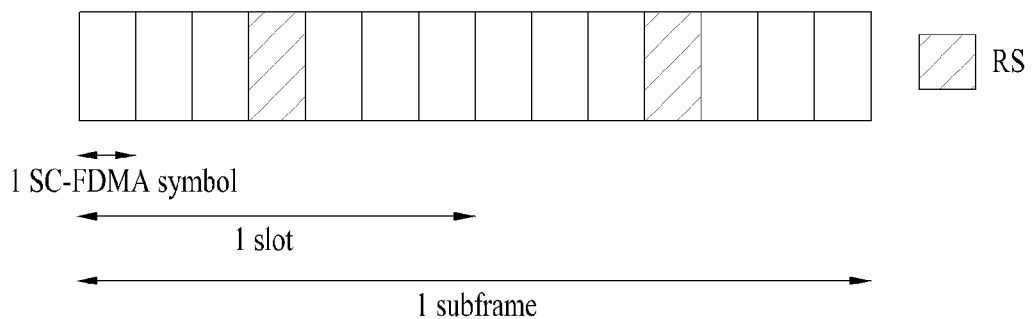
(a)
Extended CP
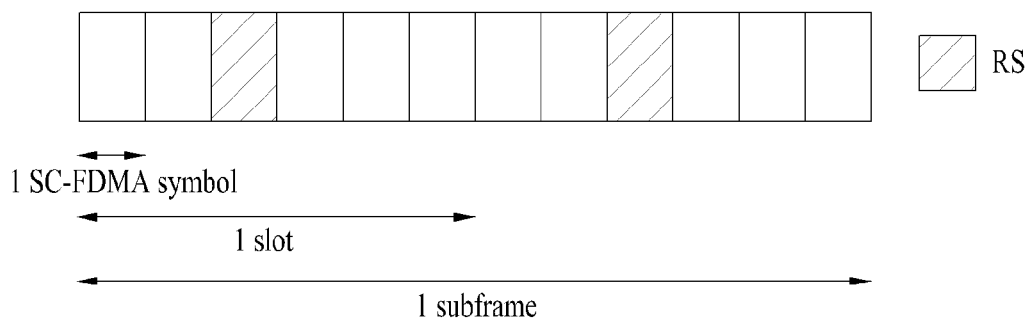
(b)

FIG. 23
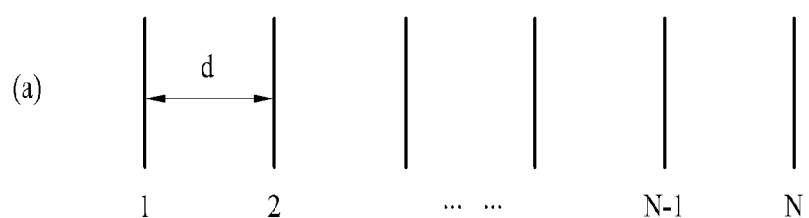
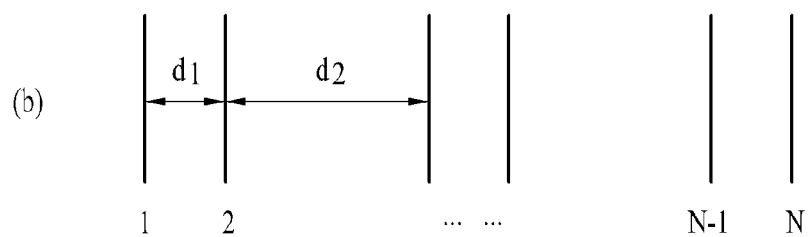
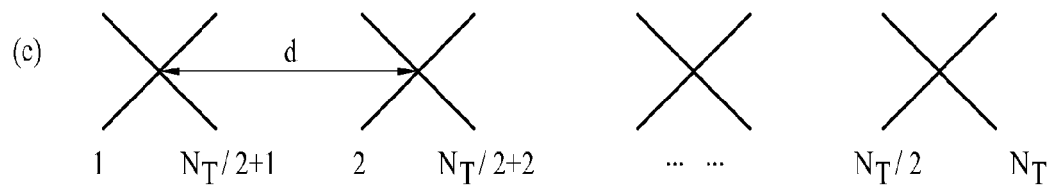

METHOD AND DEVICE FOR TRANSMITTING REFERENCE SIGNAL IN MULTI-ANTENNA SUPPORTING WIRELESS COMMUNICATION SYSTEM

CROSS-REFERENCE TO RELATED APPLICATIONS

This application is the National Stage filing under 35 U.S.C. 371 of International Application No. PCT/KR2015/002284, filed on Mar. 10, 2015, which claims the benefit of U.S. Provisional Application No. 61/951,549, filed on Mar. 12, 2014, the contents of which are all hereby incorporated by reference herein in their entirety.

TECHNICAL FIELD

The present invention relates to a wireless communication system, and more particularly, to a method and device for transmitting a reference signal in a multi-antenna supporting wireless communication system.

BACKGROUND ART

MIMO (multiple-input multiple-output) technology means a method of improving data transfer efficiency by adopting multiple transmitting antennas and multiple receiving antennas instead of using a single transmitting antenna and a single receiving antenna. In particular, the MIMO technology is the technology for improving capacity or performance of a transmitting or receiving end of a wireless communication system by using multiple antennas. In addition, the MIMO technology can be referred to as a multi-antenna technology.

To support MIMO transmission, a precoding matrix can be applied to properly distribute transmission information to each antenna according to a channel status and the like. In the conventional 3GPP ($3^{rd}$ generation partnership project) LTE (long term evolution) system, maximum 4 transmit antennas (4Tx) are supported for downlink transmission and a related precoding codebook is defined.

DISCLOSURE OF THE INVENTION

Technical Task

Based on the above-described discussion, a method and device for transmitting a reference signal in a wireless communication system supporting multiple antennas are proposed.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In a first technical aspect of the present invention, provided herein is a method of estimating a channel by a user equipment in a wireless communication system supporting multiple antennas, including: receiving a CSI-RS (channel state information-reference signal) for a multitude of first domain antennas and a CRS (cell-specific reference signal) for a multitude of second domain antennas and; estimating entire channels based on both a first channel for the first domain antennas estimated from the CSI-RS and a second channel for the second domain antennas estimated from the CRS.

Preferably, the entire channels may be determined by Kronecker product of the first channel and the second channel.

Preferably, when the first domain antennas are vertical domain antennas, the second domain antennas may be horizontal domain antennas. On the contrary, when the first domain antennas are the horizontal domain antennas, the second domain antennas may be the vertical domain antennas.

Preferably, the CSI-RS and the CRS may be configured through RRC (radio resource control) signaling.

Preferably, the CRS may be a CRS quasi co-located with the CSI-RS or a CRS of a serving cell.

Preferably, the method may further include feeding back channel state information on the entire channels to a base station.

In a second technical aspect of the present invention, provided herein is a method of estimating a channel by a user equipment in a wireless communication system supporting multiple antennas, including: receiving a CSI-RS (channel state information-reference signal) for a multitude of vertical antennas and first horizontal antennas and a CRS (cell-specific reference signal) for second horizontal antennas; and estimating entire channels based on both a vertical antenna channel estimated from the CSI-RS and a horizontal antenna channel estimated from the CSI-RS and the CRS.

Preferably, the entire channels may be determined by Kronecker product of the vertical antenna channel and the horizontal antenna channel.

In a third technical aspect of the present invention, provided herein is a user equipment for performing channel estimation in a wireless communication system supporting multiple antennas, including: a radio frequency unit and a processor. The processor may be configured to receive a CSI-RS (channel state information-reference signal) for a multitude of first domain antennas and a CRS (cell-specific reference signal) for a multitude of second domain antennas and estimate entire channels based on both a first channel for the first domain antennas estimated from the CSI-RS and a second channel for the second domain antennas estimated from the CRS.

Advantageous Effects

According to embodiments of the present invention, a reference signal can be efficiently transmitted in a wireless communication system supporting multiple antennas.

It will be appreciated by persons skilled in the art that that the effects achieved by the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 13 is a diagram to describe a scheme of mapping a DFT-processed signal into a frequency domain.

FIG. 15 is a diagram for a location of a symbol to which a reference signal is mapped.

FIG. 23 is a diagram for examples of configuring 8 transmitting antennas.

BEST MODE FOR INVENTION

Figure 1:
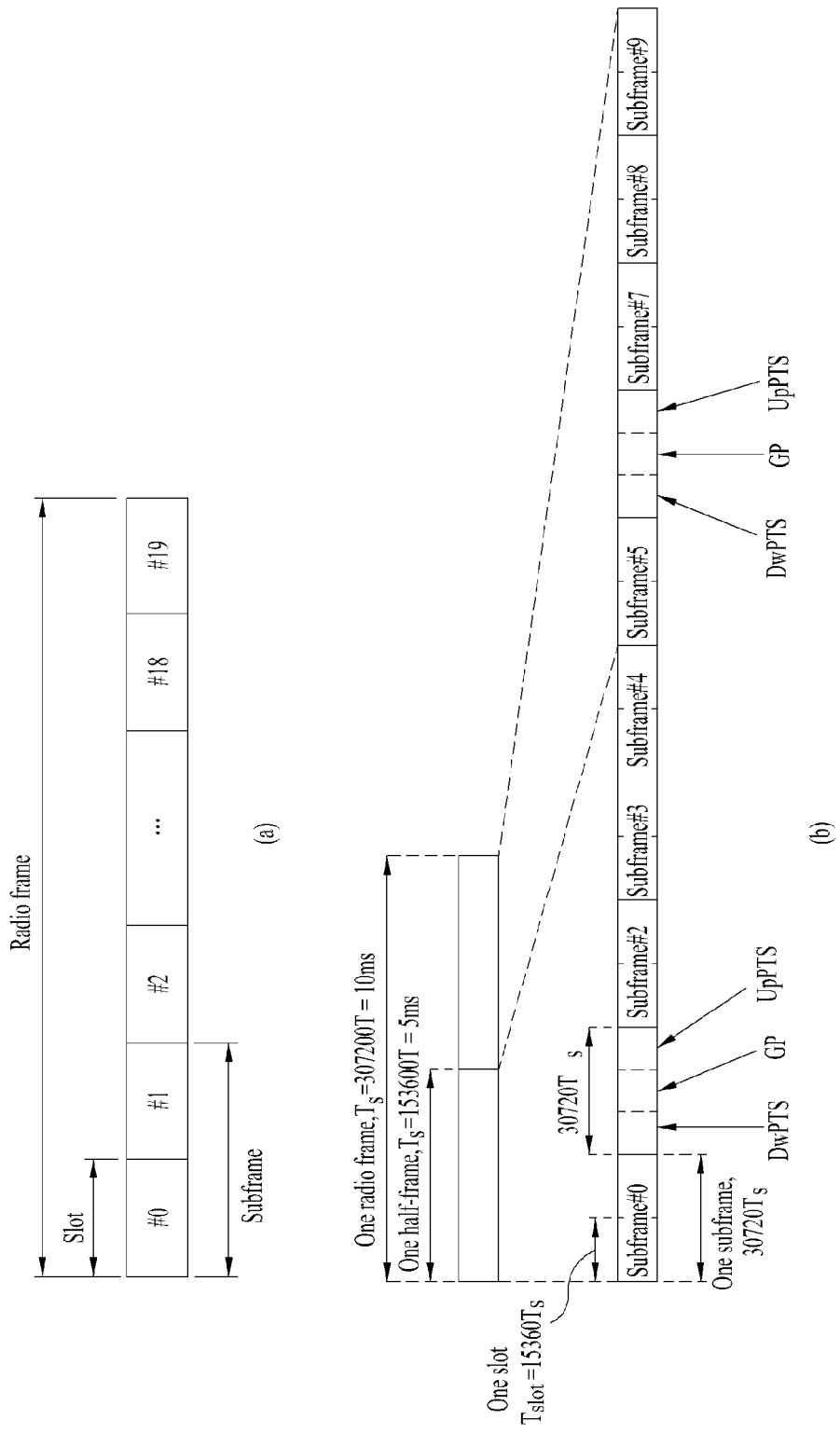
FIG. 1 is a diagram to describe a structure of a downlink radio frame.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In this specification, the embodiments of the present invention have been described based on the data transmission and reception between a base station BS and a user equipment UE. In this case, the base station BS means a terminal node of a network, which performs direct communication with the user equipment UE. A specific operation which has been described as being performed by the base station may be performed by an upper node of the base station BS as the case may be.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point (AP) as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary. In the present specification, an uplink transmitter may be a UE or a relay and an uplink receiver may be a BS or a relay. Similarly, a downlink transmitter may be a BS or a relay and a downlink receiver may be a UE or a relay. In other words, uplink transmission may mean transmission from a UE to a BS, transmission from a UE to a relay, or transmission from a relay to a BS. Similarly, downlink transmission may mean transmission from a BS to a UE, transmission from a BS to a relay or transmission from a relay to a UE.

Specific terminologies hereinafter used in the embodiments of the present invention are provided to assist understanding of the present invention, and various modifications may be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention may be supported by standard documents disclosed in at least one of wireless access systems, i.e., IEEE 802 system, 3GPP system, 3GPP LTE system, 3GPP LTE, 3GPP LTE-A (LTE-Advanced) system, and 3GPP2 system. Namely, among the embodiments of the present invention, apparent steps or parts, which are not described to clarify technical spirits of the present invention, may be supported by the above documents. Also, all terminologies disclosed herein may be described by the above standard documents.

The following technologies can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. The CDMA may be embodied with wireless (or radio) technology such as UTRA (Universal Terrestrial Radio Access) or CDMA2000. The TDMA may be embodied with wireless (or radio) technology such as GSM (Global System for Mobile communications)/GPRS (General Packet Radio Service)/EDGE (Enhanced Data Rates for GSM Evolution). The OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). The UTRA is a part of the UMTS (Universal Mobile Telecommunications System). The 3GPP (3rd Generation Partnership Project) LTE (long term evolution) is a part of the E-UMTS (Evolved UMTS), which uses E-UTRA. The 3GPP LTE employs the OFDMA in downlink and employs the SC-FDMA in uplink. The LTE-Advanced (LTE-A) is an evolved version of the 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on the 3GPP LTE and LTE-A system. However, the technical spirit of the present invention is not limited thereto.

Hereinafter, the structure of a downlink radio frame will be described with reference to FIG. 1.

In a cellular Orthogonal Frequency Division Multiplexing (OFDM) radio packet communication system, uplink/downlink data packet transmission is performed in subframe units. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time division duplexing (TDD).

FIG. 1(a) is a diagram showing the structure of the type 1 radio frame. A downlink radio frame includes 10 subframes, and one subframe includes two slots in a time domain. A time required to transmit one subframe is defined in a Transmission Time Interval (TTI). For example, one subframe may have a length of 1 ms and one slot may have a length of 0.5 ms. One slot may include a plurality of OFDM symbols in a time domain and include a plurality of Resource Blocks (RBs) in a frequency domain. Since the 3GPP LTE system uses OFDMA in downlink, an OFDM symbol indicates one symbol duration. The OFDM symbol may be called a SC-FDMA symbol or a symbol duration. A RB is a resource allocation unit and includes a plurality of contiguous carriers in one slot.

The number of OFDM symbols included in one slot may be changed according to the configuration of a Cyclic Prefix (CP). The CP includes an extended CP and a normal CP. For example, if the OFDM symbols are configured by the normal CP, the number of OFDM symbols included in one slot may be seven. If the OFDM symbols are configured by the extended CP, the length of one OFDM symbol is increased, the number of OFDM symbols included in one slot is less than that of the case of the normal CP. In case of the extended CP, for example, the number of OFDM symbols included in one slot may be six. If a channel state is instable, for example, if a User Equipment (UE) moves at a high speed, the extended CP may be used in order to further reduce interference between symbols.

In case of using the normal CP, since one slot includes seven OFDM symbols, one subframe includes 14 OFDM symbols. At this time, the first two or three OFDM symbols of each subframe may be allocated to a Physical Downlink Control Channel (PDCCH) and the remaining OFDM symbols may be allocated to a Physical Downlink Shared Channel (PDSCH).

The structure of a type 2 radio frame is shown in FIG. 1(b). The type 2 radio frame includes two half-frames, each of which is made up of five subframes, a downlink pilot time slot (DwPTS), a guard period (GP), and an uplink pilot time slot (UpPTS), in which one subframe consists of two slots. That is, one subframe is composed of two slots irrespective of the radio frame type. DwPTS is used to perform initial cell search, synchronization, or channel estimation. UpPTS is used to perform channel estimation of a base station and uplink transmission synchronization of a user equipment (UE). The guard interval (GP) is located between an uplink and a downlink so as to remove interference generated in uplink due to multi-path delay of a downlink signal. That is, one subframe is composed of two slots irrespective of the radio frame type.

The structure of the radio frame is only exemplary. Accordingly, the number of subframes included in the radio frame, the number of slots included in the subframe or the number of symbols included in the slot may be changed in various manners.

Figure 2:
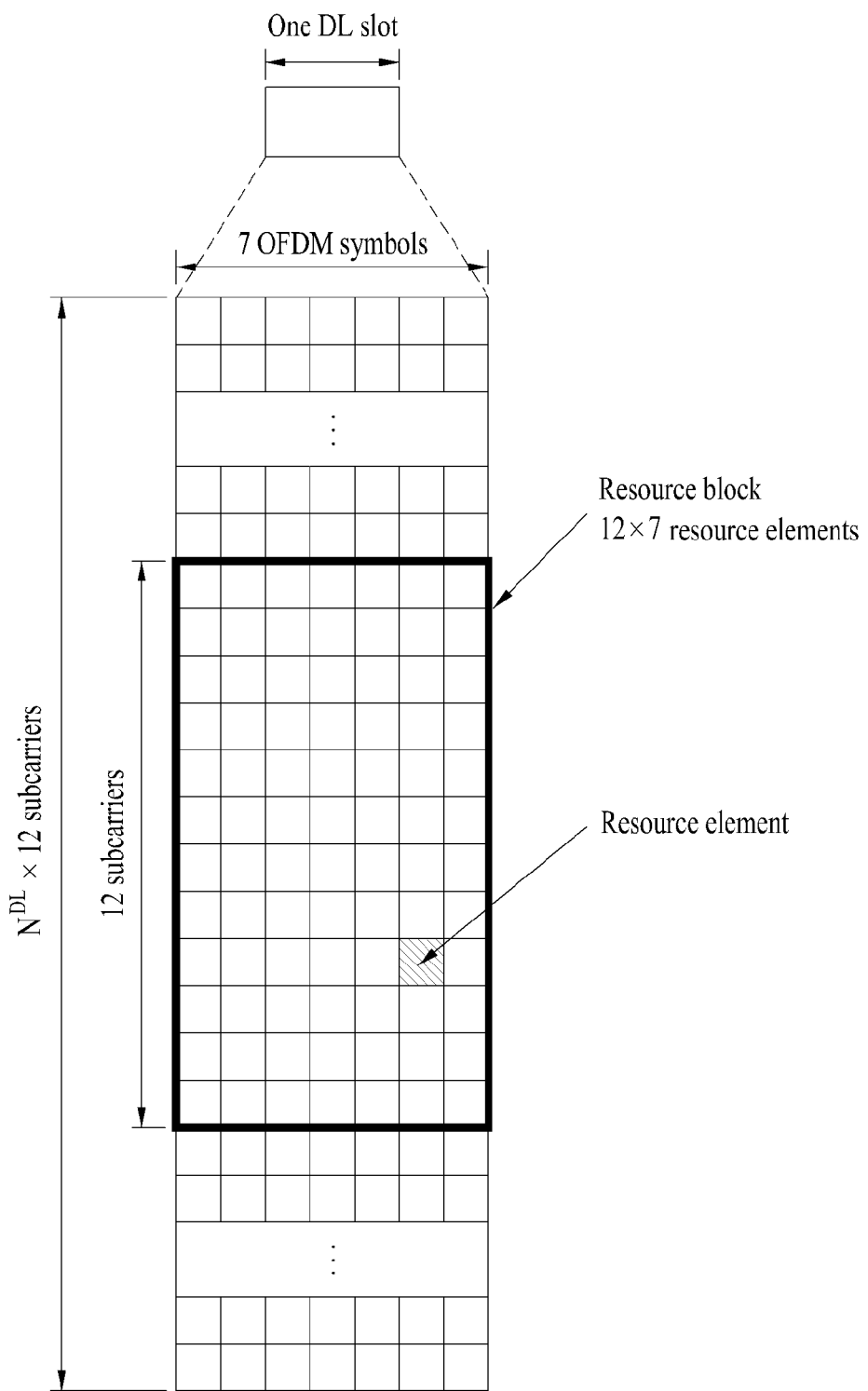
FIG. 2 is a diagram for one example of a resource grid for one downlink slot.

FIG. 2 is a diagram showing an example of a resource grid in one downlink slot. OFDM symbols are configured by the normal CP. Referring to FIG. 2, the downlink slot includes a plurality of OFDM symbols in a time domain and includes a plurality of RBs in a frequency domain. Although one downlink slot includes seven OFDM symbols and one RB includes 12 subcarriers, the present invention is not limited thereto. Each element of the resource grid is referred to as a Resource Element (RE). For example, an RE a(k,l) is located at a k-th subcarrier and an 1-th OFDM symbol. In case of the normal CP, one RB includes 12×7 REs (in case of the extended CP, one RB includes 12×6 REs). Since a distance between subcarriers is 15 kHz, one RB includes about 180 kHz in the frequency region. $N^{DL}$ denotes the number of RBs included in the downlink slot. The $N^{DL}$ is determined based on downlink transmission bandwidth set by scheduling of a base station (BS).

Figure 3:
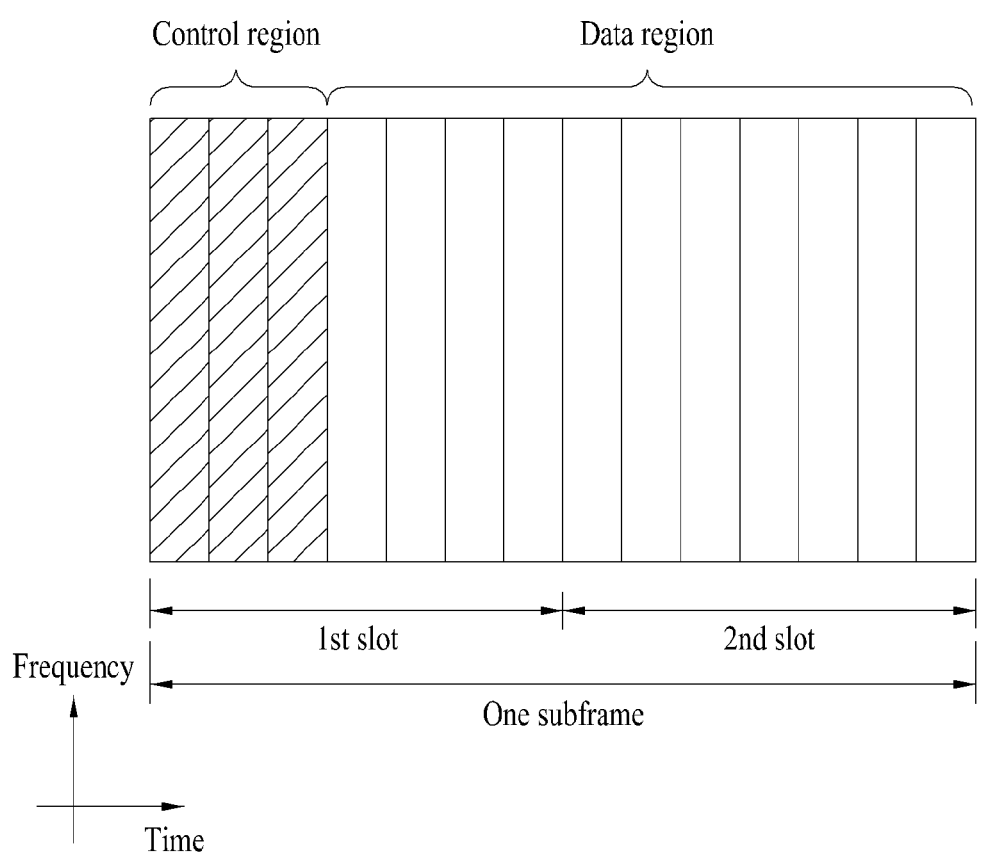
FIG. 3 is a diagram for a structure of a downlink subframe.

FIG. 3 is a diagram showing the structure of a downlink subframe. A maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. The basic unit of transmission becomes one subframe. That is, a PDCCH and a PDSCH are allocated to two slots. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and includes information about the number of OFDM symbols used to transmit the control channel in the subframe. The PHICH includes a HARQ ACK/NACK signal as a response to uplink transmission. The control information transmitted through the PDCCH is referred to as Downlink Control Information (DCI). The DCI includes uplink or downlink scheduling information or an uplink transmit power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of a higher layer control message such as a Random Access Response (RAR) transmitted on the PDSCH, a set of transmit power control commands for individual UEs in a certain UE group, transmit power control information, activation of Voice over IP (VoIP), etc. A plurality of PDCCHs may be transmitted within the control region. The UE may monitor the plurality of PDCCHs. The PDCCHs are transmitted on an aggregation of one or several contiguous control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The base station determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 4:
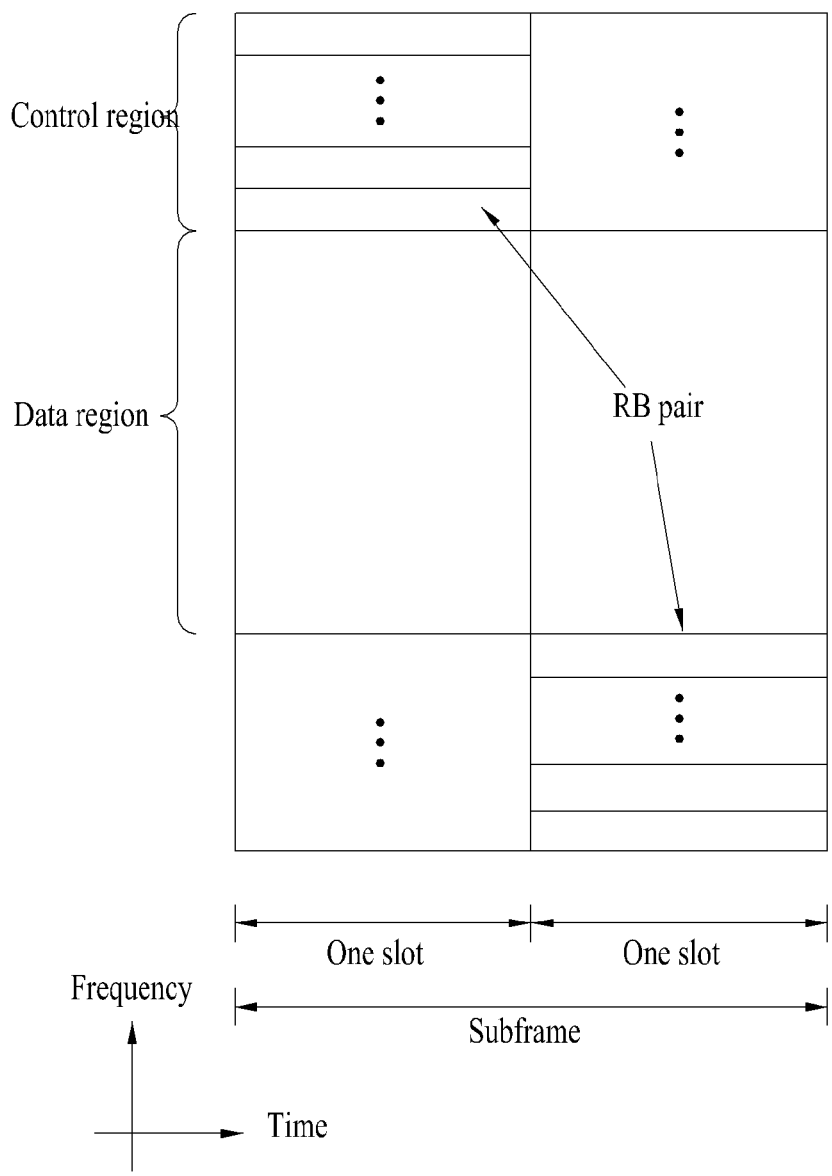
FIG. 4 is a diagram for a structure of an uplink subframe.

FIG. 4 is a diagram showing the structure of an uplink frame. The uplink subframe may be divided into a control region and a data region in a frequency domain. A Physical Uplink Control Channel (PUCCH) including uplink control information is allocated to the control region. A Physical uplink Shared Channel (PUSCH) including user data is allocated to the data region. In order to maintain single carrier characteristics, one UE does not simultaneously transmit the PUCCH and the PUSCH. The PUCCH for one UE is allocated to an RB pair in a subframe. RBs belonging to the RB pair occupy different subcarriers with respect to two slots. Thus, the RB pair allocated to the PUCCH is "frequency-hopped" at a slot edge.

Reference Signal

In the MIMO system, each transmitting antenna has an independent data channel. The transmitting antenna may signify a virtual antenna or a physical antenna. A reception subject may estimate a channel with respect to each transmitting antenna of a transmission subject, thereby being capable of receiving data transmitted from each transmitting antenna. Channel estimation refers to a process of recovering a received signal by compensating for a distortion in a signal, which is caused by fading. Herein, fading refers to an effect wherein the intensity of a signal is changed abruptly due to a multi path-time delay in a wireless telecommunications system environment. In order to perform channel estimation, a reference signal commonly known by the transmission subject and the reception subject is required. A reference signal may also simply be referred to as an RS (Reference Signal) or may also be referred to as a Pilot depending upon the applied standard.

In the legacy 3GPP LTE Release-8 or -9 system, a downlink reference signal transmitted by a base station is defined. Downlink reference signal is a pilot signal for coherent demodulation of such a channel as PDSCH (Physical Downlink Shared CHannel), PCFICH (Physical Control Format Indicator CHannel), PHICH (Physical Hybrid Indicator CHannel), PDCCH (Physical Downlink Control CHannel) and the like. The downlink reference signal may be categorized into a common reference signal (CRS) shared by all user equipments in a cell and a dedicated reference signal (DRS) for a specific user equipment only. The common reference signal may be called a cell-specific reference signal. And, the dedicated reference signal may be called a user equipment-specific (UE-specific) reference signal or a demodulation reference signal (DMRS).

Downlink reference signal assignment in the legacy 3GPP LTE system is described as follows. First of all, a position (i.e., a reference signal pattern) of a resource element for carrying a reference signal is described with reference to one resource block pair (i.e., 'one subframe length in time domain'×'12-subcarrier length in frequency domain'). A single subframe is configured with 14 OFDM symbols (in case of a normal CP) or 12 OFDM symbols (in case of an extended CP). The number of subcarriers in a single OFDM symbol is set to one of 128, 256, 512, 1024, 1536 and 2048 to use.

Figure 5:
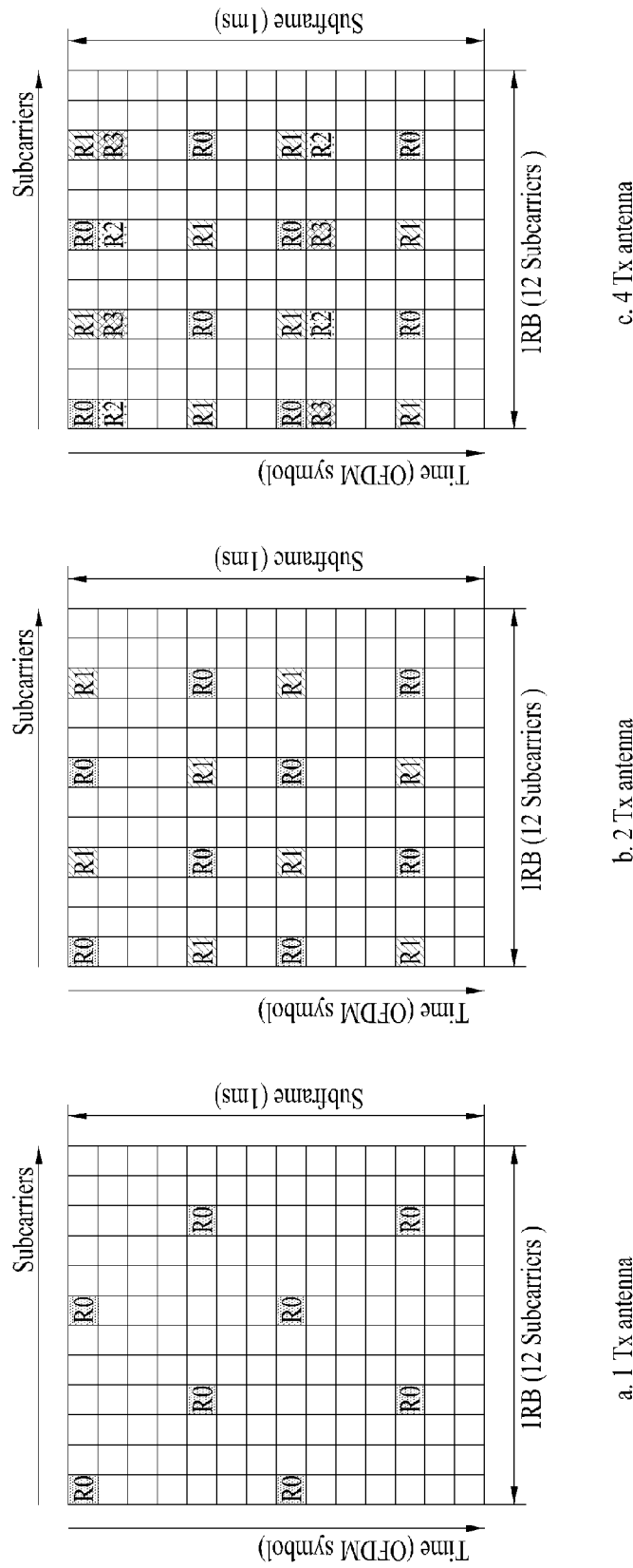
FIG. 5 is a diagram for a pattern of a common reference signal (CRS).

FIG. 5 shows a pattern of a common reference signal (CRS) in case that 1-TTI (i.e., 1 subframe) has 14 OFDM symbols. FIG. 5 (a), FIG. 5 (b) and FIG. 5 (c) relates to a CRS pattern for a system having 1 Tx (transmitting) antenna, a CRS pattern for a system having 2 Tx antennas and a CRS pattern for a system having 4 Tx antennas, respectively.

In FIG. 5, R0 indicates a reference signal for an antenna port index 0. In FIG. 5, R1 indicates a reference signal for an antenna port index 1, R2 indicates a reference signal for an antenna port index 2, and R3 indicates a reference signal for an antenna port index 3. Regarding a position of an RE for carrying a reference signal for each of the antenna ports, no signal is transmitted from the rest of all antenna ports except the antenna port for transmitting a reference signal to prevent interference.

Figure 6:
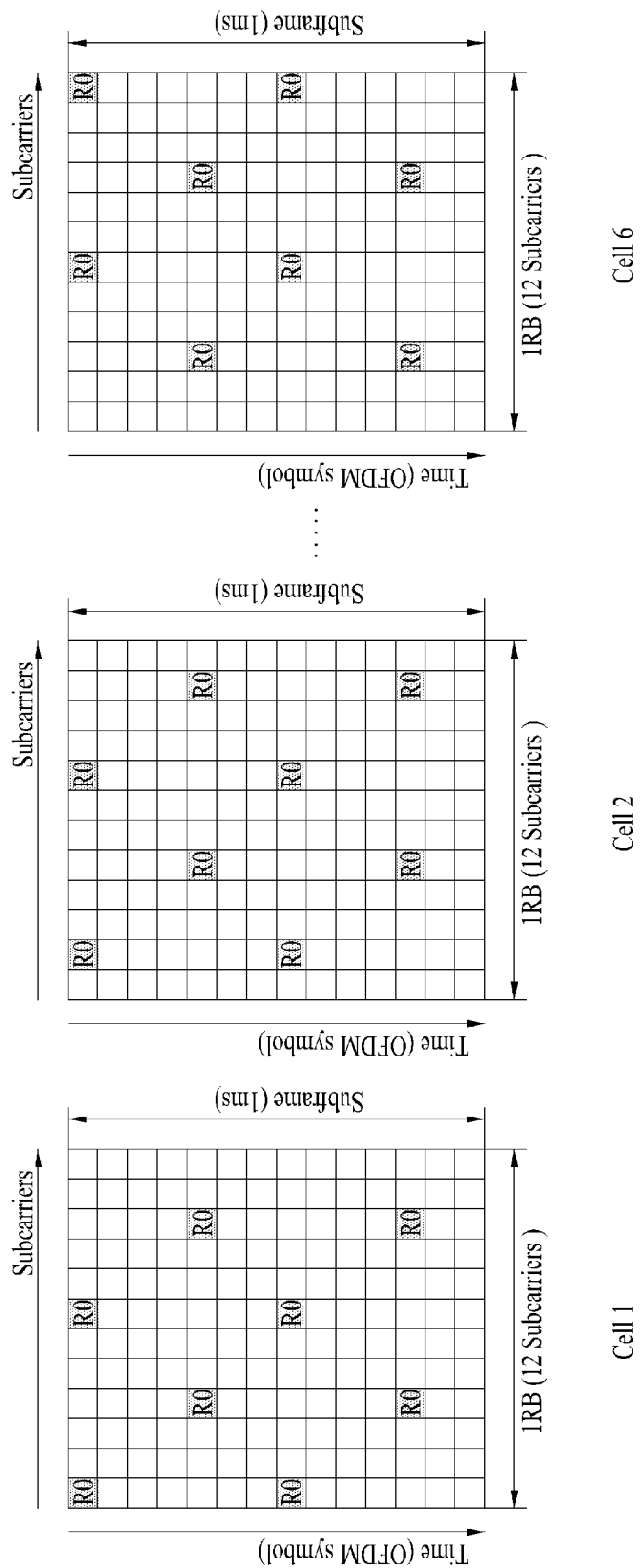
FIG. 6 is a diagram to describe a shift of a reference signal pattern.

FIG. 6 shows that a reference signal pattern is shifted in each cell to prevent reference signals of various cells from colliding with each other. Assuming that a reference signal pattern for one antenna port shown in FIG. 5 (a) is used by a cell #1 (Cell 1) shown in FIG. 6, in order to prevent collision of reference signals between cells including a cell #2 adjacent to the cell #1, a cell #3 adjacent to the cell #1 and the like, it is able to protect a reference signal in a manner of shifting a reference signal pattern by subcarrier or OFDM symbol unit in frequency or time domain. For instance, in case of 1 Tx antenna transmission, since a reference signal is situated in 6-subcarrier interval on a single OFDM symbol, if a shift by subcarrier unit in frequency domain is applied to each cell, at least 5 adjacent cells may be able to situate reference signals on different resource elements, respectively. For instance, a frequency shift of a reference signal may be represented as the cell #2 and the cell #6 in FIG. 6.

Moreover, by multiplying a downlink reference signal per cell by a pseudo-random (PN) sequence and then transmitting the multiplied signal, interference caused to a receiver by a reference signal received from an adjacent cell can be reduced to enhance channel estimation performance. This PN sequence may be applicable by OFDM symbol unit in a single subframe. Regarding the PN sequence, a different sequence may be applicable per cell ID, subframe number or OFDM symbol position.

In a system [e.g., 8-Tx antenna supportive wireless communication system (e.g., 3GPP LTE Release-10 system, a systems according to 3GPP LTE Releases next to Release-10, etc.)] having antenna configuration more extended than a legacy 4-Tx antenna supportive communication system (e.g., 3GPP LTE Release-8 system, 3GPP LTE Release-9 system, etc.), DMRS based data demodulation is taken into consideration to support efficient management & operation and developed transmission scheme of reference signals. In particular, in order to support data transmission via extended antennas, it may be able to define DMRS for at least two layers. Since DMRS is precoded by the same precoder of data, it is easy for a receiving side to estimate channel information for demodulating data without separate precoding information. Meanwhile, a downlink receiving side is able to acquire channel information precoded for the extended antenna configuration through DMRS. Yet, a separate reference signal other than the DMRS is requested to acquire non-precoded channel information. Hence, in a system by LTE-A standards, a reference signal (i.e., CSI-RS) for a receiving side to acquire channel state information (CSI) can be defined. In particular, CSI-RS may be transmitted via 8 antenna ports. In order to discriminate a CSI-RS transmitted antenna port from an antenna port of 3GPP LTE Release-8/9, it may be able to use antenna port indexes 15 to 22.

Configuration of Downlink Control Channel

As a region for transmitting a downlink control channel, first three OFDM symbols of each subframe are available. In particular, 1 to 3 OFDM symbols are available in accordance with overhead of the downlink control channel. In order to adjust the number of OFDM symbols for a downlink control channel in each subframe, it may be able to use PCFICH. And, it is able to use PHICH to provide an acknowledgment response [ACK/NACK (acknowledgement/negative-acknowledgement)] to an uplink transmission in downlink. Moreover, it is able to use PDCCH to transmit control information for a downlink or uplink data transmission.

Figure 7:
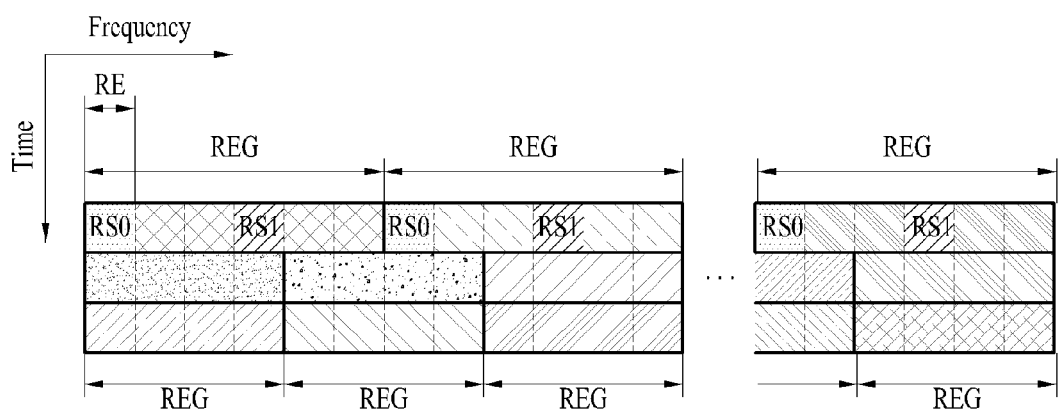
FIG. 7 and FIG. 8 are diagrams to describe a resource element group (REG) corresponding to a unit to which downlink control channels are assigned.
Figure 8:
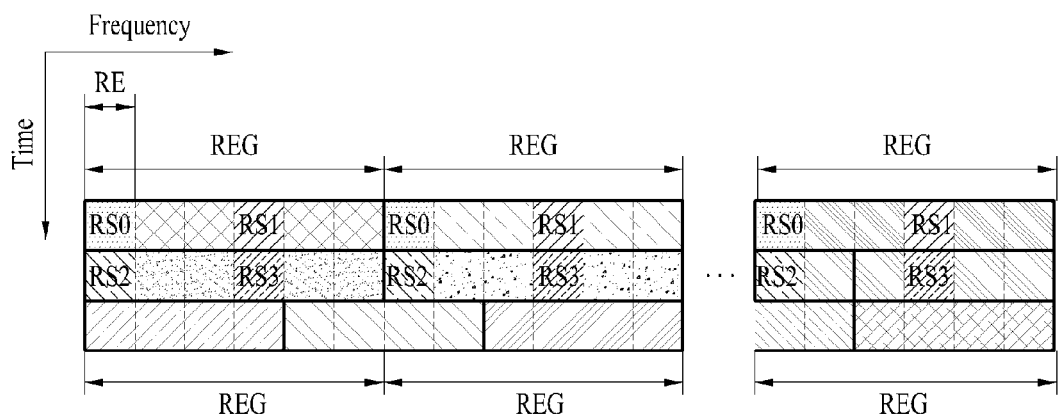

FIG. 7 and FIG. 8 show that the above-configured downlink control channels are assigned by resource element group (REG) unit in a control region of each subframe. FIG. 7 relates to a system having 1- or 2-Tx antenna configuration and FIG. 8 relates to a system having 4-Tx antenna configuration. Referring to FIG. 7 and FIG. 8, REG corresponding to a basic resource unit for assigning a control channel is configured with 4 contiguous Res in frequency domain except a resource element for assigning a reference signal. A specific number of REGs are available for a transmission of a downlink control channel in accordance with overhead of the downlink control channel.

PCFICH (Physical Control Format Indicator Channel)

In order to provide every subframe with resource allocation information of the corresponding subframe and the like, it is able to transmit PDCCH between OFDM symbol indexes 0 to 2. In accordance with overhead of a control channel, it may be able to use the OFDM symbol index 0, the OFDM symbol indexes 0 and 1, or the OFDM symbol indexes 0 to 2. Thus, the number of OPFDM symbols used for a control channel is changeable for each subframe. And, information on the OFDM symbol number may be provided via PCFICH. Hence, the PCFICH should be transmitted in every subframe.

Three kinds of informations can be provided through the PCFICH. Table 1 in the following shows CFI (control format indicator) of PCFICH. 'CFI=1' indicates that PDCCH is transmitted on OFDM symbol index 0, 'CFI=2' indicates that PDCCH is transmitted on OFDM symbol indexes 0 and 1, and 'CFI=3' indicates that PDCCH is transmitted on OFDM symbol indexes 0 to 2.

TABLE 1

| CFI | CFI codeword <br> <$b_0, b_1, \ldots, b_{31}$> |
|---|---|
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

Information carried on PCFICH may be defined different in accordance with a system bandwidth. For instance, in case that a bandwidth of a system is smaller than a specific threshold, 'CFI=1' may indicate that 2 OFDM symbols are used for PDCCH. 'CFI=2' may indicate that 3 OFDM symbols are used for PDCCH. And, 'CFI=3' may indicate that 4 OFDM symbols are used for PDCCH.

Figure 9:
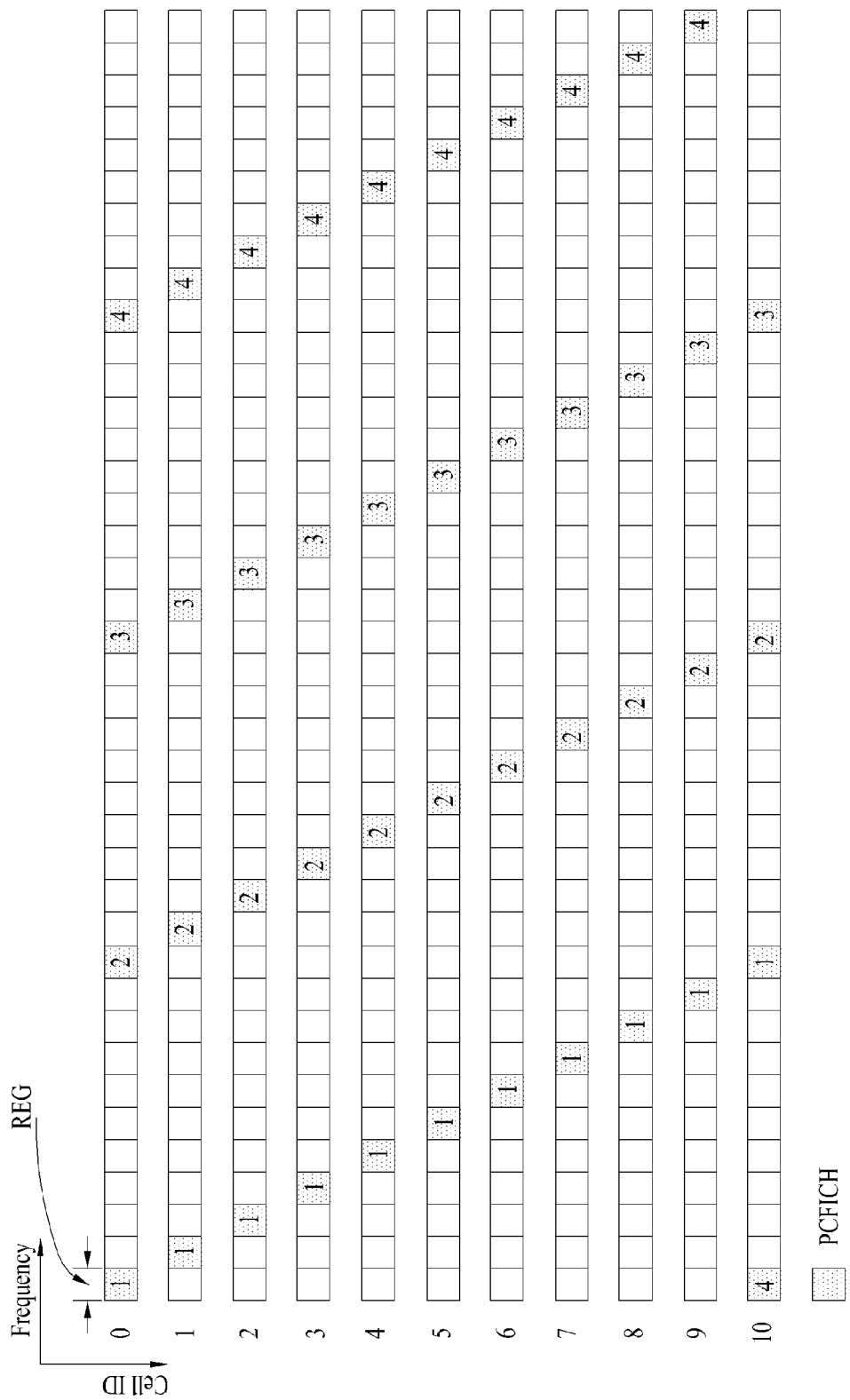
FIG. 9 is a diagram to illustrate a scheme of transmitting PCFICH.

FIG. 9 is a diagram for a scheme of transmitting PCIFCH. REG shown in FIG. 9 is configured with 4 subcarriers, and more particularly, with data subcarriers except RS (reference signal). Generally, a transmit diversity scheme may apply thereto. A position of the REG may be frequency-shifted per cell (i.e., in accordance with a cell identifier) not to cause interference between cells. Additionally, PCFICH is always transmitted on a $1^{st}$ OFDM symbol (i.e., OFDM symbol index 0) of a subframe. Hence, when a receiving end receives a subframe, the receiving end acquires the number of OFDM symbols for carrying PDCCH by checking information of PCFICH and is then able to receive control information transmitted on the PDCCH.

PHICH (Physical Hybrid-ARQ Indicator Channel)

Figure 10:
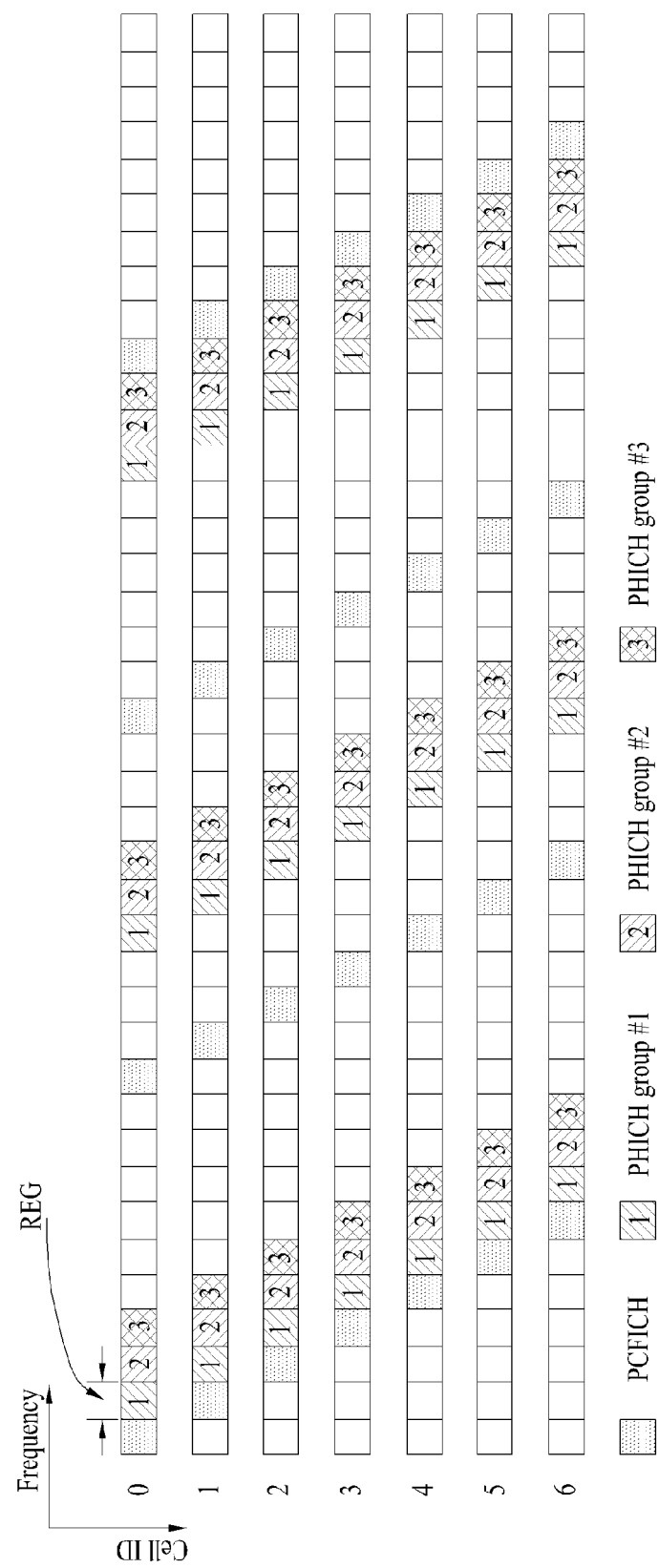
FIG. 10 is a diagram for locations of PCFICH and PHICH.

FIG. 10 is a diagram to illustrate positions of PCFICH and PHICH generally applied for a specific bandwidth. ACK/NACK information on an uplink data transmission is transmitted on PHICH. Several PHICH groups are created in a single subframe and several PHICHs exist in a single PHICH group. Hence, PHICH channels for several user equipments are included in the single PHICH group.

Referring to FIG. 10, PHICH assignment for each user equipment in several PHICH groups are performed using a lowest PRB (physical resource block) index of PUSCH resource allocation and a cyclic shift index for a demodulation reference signal (DMRS) transmitted on a UL (uplink) grant PDCCH. In this case, the DMRS is a UL reference signal and is the signal provided together with a UL transmission for channel estimation for demodulation of UL data. Moreover, PHICH resource is known through such an index pair as $(n_{PHICH}^{group}, n_{PHICH}^{seq})$. In $(n_{PHICH}^{group}, n_{PHICH}^{seq})$, $n_{PHICH}^{group}$ means a PHICH group number) and $n_{PHICH}^{seq}$ means an orthogonal sequence index in the corresponding PHICH group. $n_{PHICH}^{group}$ and $n_{PHICH}^{seq}$ is defined as Formula 1.

$$n_{PHICH}^{group} = (I_{PRB\_RA}^{lowest\_index} + n_{DMRS}) \bmod N_{PHICH}^{group}$$

$$n_{PHICH}^{seq} = (\lfloor I_{PRB\_RA}^{lowest\_index}/N_{PHICH}^{group} \rfloor + n_{DMRS}) \bmod 2N_{SF}^{PHICH} \quad [\text{Formula 1}]$$

In Formula 1, $n_{DMRS}$ indicates a cyclic shift of DMRS used for a PHICH associated UL transmission. And, $N_{SF}^{PHICH}$ indicates a spreading factor size used for PHICH. $I_{PRB\_RA}^{lowest\_index}$ indicates a lowest PRB index of a UL resource allocation. $N_{PHICH}^{group}$ indicates the number of the configured PHICH groups and may be defined as Formula 2.

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases} \quad [\text{Formula 2}]$$

In Formula 2, $N_g$ indicates an amount of PHICH resource transmitted on PBCH (Physical Broadcast Channel) and $N_g$ is represented as $N_g \in \{1/6, 1/2, 1, 2\}$ in 2-bit size.

One example of an orthogonal sequence defined by the legacy 3GPP LTE Release-8/9 is shown in Table 2.

TABLE 2

| Sequence index $n_{PHICH}^{seq}$ | Orthogonal sequence | |
|---|---|---|
| | Normal cyclic prefix $N_{SF}^{PHICH} = 4$ | Extended cyclic prefix $N_{SF}^{PHICH} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

Figure 11:
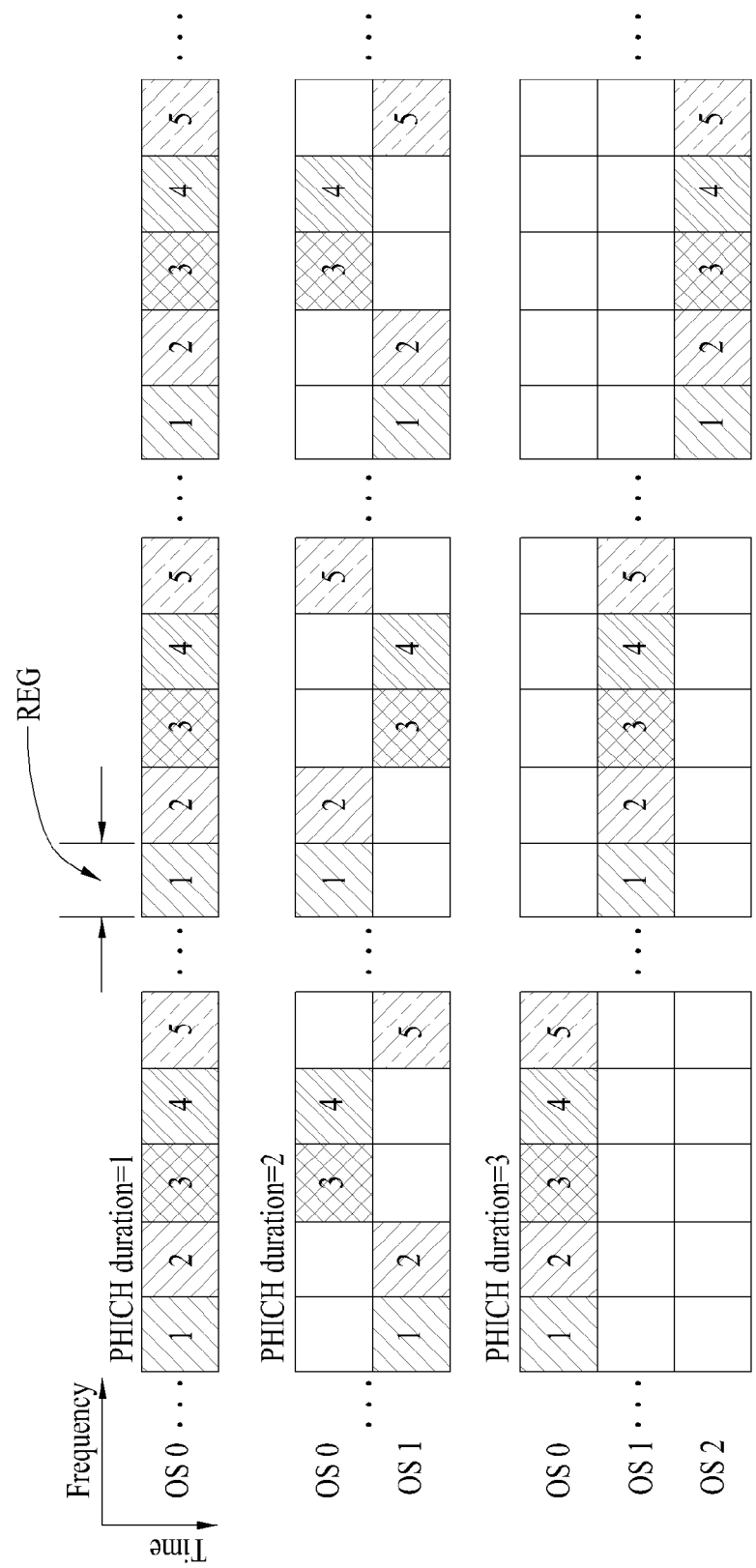
FIG. 11 is a diagram for a location of a downlink resource element to which a PHICH group is mapped.

FIG. 11 is a diagram to illustrate a position of a downlink (DL) resource element having PHICH group mapped thereto. Referring to FIG. 11, PHICH group may be configured in different time region (i.e., a different OS (OFDM symbol)) within a single subframe.

PDCCH (Physical Downlink Control Channel)

Control information transmitted on PDCCH may have control information size and usage differing in accordance with a DCI (downlink control information) format. And, a size of the PDCCH may vary in accordance with a coding rate. For instance, DCI formats used by the legacy 3GPP LTE Release-8/9 may be defined as Table 3.

TABLE 3

| DCI format | Objectives |
|---|---|
| 0 | Scheduling of PUSCH |
| 1 | Scheduling of one PDSCH codeword |
| 1A | Compact scheduling of one PDSCH codeword |
| 1B | Closed-loop single-rank transmission |
| 1C | Paging, RACH response and dynamic BCCH |
| 1D | MU-MIMO |
| 2 | Scheduling of rank-adapted closed-loop spatial multiplexing mode |
| 2A | Scheduling of rank-adapted open-loop spatial multiplexing mode |
| 3 | TPC commands for PUCCH and PUSCH with 2 bit power adjustments |
| 3A | TPC commands for PUCCH and PUSCH with single bit power adjustments |

The DCI format shown in Table 3 is independently applied per user equipment and PDCCHs of several user equipments can be simultaneously multiplexed within a single subframe. The multiplexed PDCCH of each of the user equipments is independently channel-coded and CRC is applied thereto. The CRC of the PDCCH is masked with a unique identifier of each of the user equipments and can be applied to enable the corresponding user equipment to receive the PDCCH of its own. Yet, since a user equipment is basically unable to know a position of its PDCCH channel, the user equipment checks whether each of the entire PDCCH channels of the corresponding DCI format matches the PDCCH channel having the ID of the corresponding user equipment for each subframe and needs to perform blind detection until receiving the corresponding PDCCH. A basic resource allocation unit of the PDCCH is CCE (control channel element) and a single CCE is configured with 9 TEGs. A single PDCCH may be configured with 1, 2, 4 or 8 CCEs. PDCCH configured in accordance with each user equipment is interleaved into a control channel region of each subframe and then mapped by a CCE-to-RE mapping rule. This may vary an RE position having a CCE mapped thereto in accordance with the OFDM symbol number for a control channel of each subframe, the PHICH group number, Tx antennas, a frequency shift and the like.

Uplink Retransmission

Uplink (UL) retransmission may be indicated via the aforementioned PHICH and the DCI format 0 (i.e., DCI format for scheduling PUSCH transmission). A user equipment receives ACK/NACK for a previous UL transmission via PHICH and is then able to perform a synchronous non-adaptive retransmission. Alternatively, a user equipment receives a UL grant via DCI format 0 PDCCH from a base station and is then able to perform a synchronous adaptive retransmission.

The synchronous transmission means that a retransmission is performed at a predetermined timing point (e.g., $(n+k)^{th}$ subframe) after a timing point (e.g., $n^{th}$ subframe) of transmitting a data packet. In both cases of the retransmission by PHICH and the retransmission by UL grant PDCCH, the synchronous retransmission is performed.

Regarding the non-adaptive retransmission of performing a retransmission on PHICH, the same frequency resource and transmitting method of the former frequency resource (e.g., physical resource block (PRB) region) and transmitting method (e.g., modulation scheme, etc.) used for a previous transmission are applied to the retransmission. Meanwhile, regarding the adaptive retransmission of performing a retransmission via UL grant PDCCH, a frequency resource and transmitting method for performing a retransmission may be set different from those of a previous transmission in accordance with a scheduling control information indicated by a UL grant.

In case that a user equipment receives a UL grant PDCCH as soon as receives PHICH, the user equipment may be able to perform a UL transmission in accordance with control information of the UL grant PDCCH by ignoring the PHICH. Since a new data indicator (NDI) is included in the UL grant PDCCH (e.g., DCI format 0), if NDI bit is toggled more than a previously provided NDI value, the user equipment regards a previous transmission as successful and is then able to transmit new data. Meanwhile, although the user equipment receives ACK for a previous transmission via PHICH, unless the NDI value is toggled in the UL grant PDCCH received simultaneously with or after the PHICH reception, the user equipment is configured not to flush a buffer for the previous transmission.

Uplink Transmission Configuration

Figure 12:
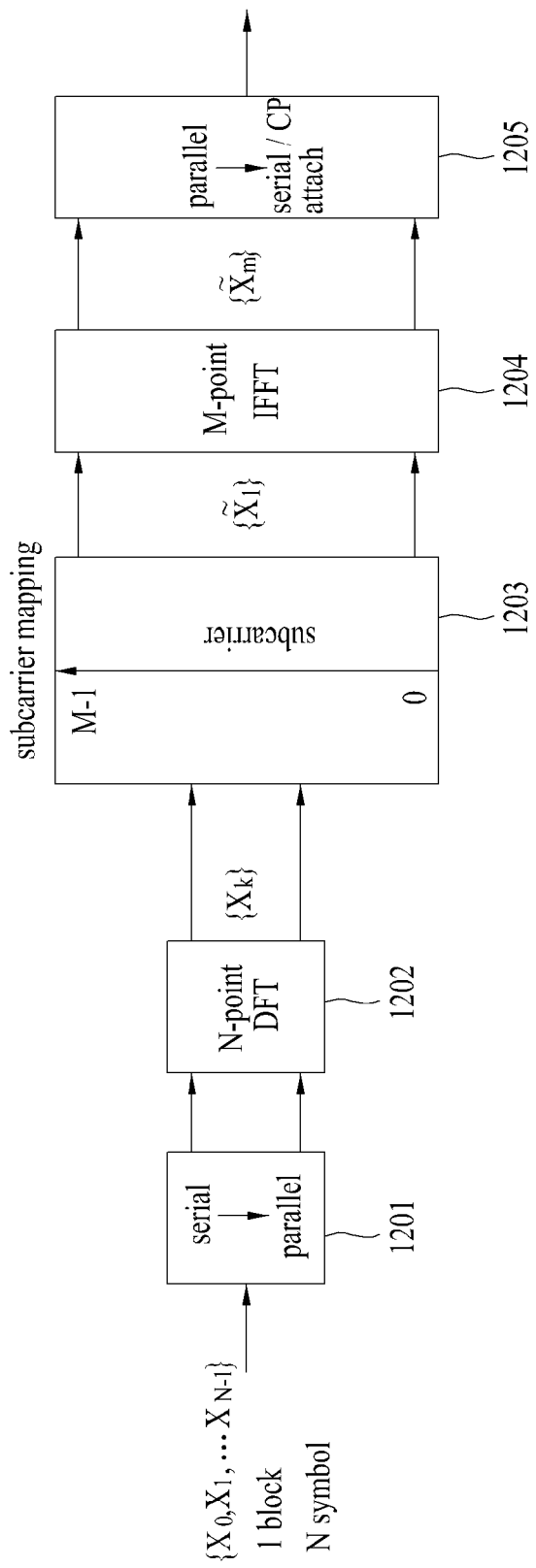
FIG. 12 is a diagram for a structure of a transmitter according to an SC-FDMA scheme

FIG. 12 is a diagram for a structure of a transmitter by SC-FDMA.

First of all, a single block configured with N symbols inputted to a transmitter is converted to a parallel signal via a serial-to-parallel converter 1201. The parallel signal spreads via an N-point DFT module 1202. The spreading signal is mapped to a frequency region via a subcarrier mapping module 1203. Signals on subcarriers configure linear combination of N symbols. The signal mapped to the frequency region is transformed into a time-domain signal via an M-point IFFT module 1204. The time-domain signal is converted to a parallel signal via a parallel-to-serial converter 1205 and then has a CP added thereto. The effect of the IFFT processing by the M-point IFFT module 1204 is cancelled out by the DFT processing of the N-point DFT module 1202 to some extent. In this point, the SC-FDMA may be named DFT-s-OFDMA (DFT-spread-OFDMA). Moreover, although the signal inputted to the DFT module 1202 has a low PAPR (peak-to-average power ratio) or CM (cubic metric), it may have a high PAPR after DFT processing. And, the signal outputted by the IFFT processing of the IFFT module 1204 may have a low PAPR again. In particular, according to the SC-FDMA, transmission is performed by avoiding a non-linear distortion interval of a power amplifier (PA), whereby a cost for implementation of a transmitting end can be reduced.

FIG. 13 is a diagram to describe a scheme of mapping a signal outputted from the DFT module 1202 to a frequency region. By performing one of the two schemes shown in FIG. 13, a signal outputted from an SC-FDMA transmitter can meet the single carrier property. FIG. 13 (a) shows a localized mapping scheme of locally mapping signals outputted from the DFT module 1202 to a specific part of a subcarrier region. FIG. 13 (b) shows a distributed mapping scheme of mapping signals outputted from the DFT module 1202 to a whole subcarrier region by being distributed. In the legacy 3GPP LTE Release-8/9 system, it is defined that the localized mapping scheme is used.

Figure 14:
FIG. 14 is a block diagram to describe a process for reference signal transmission.

FIG. 14 is a block diagram to describe a transmission processing of a reference signal to demodulate a transmitted signal by SC-FDMA. In the legacy 3GPP LTE Release-8/9 system, a data part is transmitted in a manner of transforming a signal generated from a time domain into a frequency-domain signal by DFT processing, performing subcarrier mapping on the frequency-domain signal, and then performing IFFT processing on the mapped signal [cf. FIG. 12]. Yet, a reference signal (RS) is defined as directly generated in frequency domain without DFT processing, mapped to subcarrier, undergoing IFFT processing, and then having CP addition thereto.

FIG. 15 is a diagram to illustrate a symbol position having a reference signal (RS) mapped thereto in a subframe structure according to SC-FDMA. FIG. 15 (a) shows that RS is located at $4^{th}$ SC-FDMA symbol of each of 2 slots in a single subframe in case of a normal CP. FIG. 15 (b) shows that RS is located at $3^{rd}$ SC-FDMA symbol of each of 2 slots in a single subframe in case of an extended CP.

Clustered DFT-s-OFDMA scheme is described with reference to FIGS. 16 to 19 as follows. The clustered DFT-s-OFDMA is the modification of the aforementioned SC-FDMA. According to the clustered DFT-s-OFDMA, a DFT-processed signal is segmented into a plurality of sub-blocks and then mapped to a spaced position in frequency domain.

Figure 16:
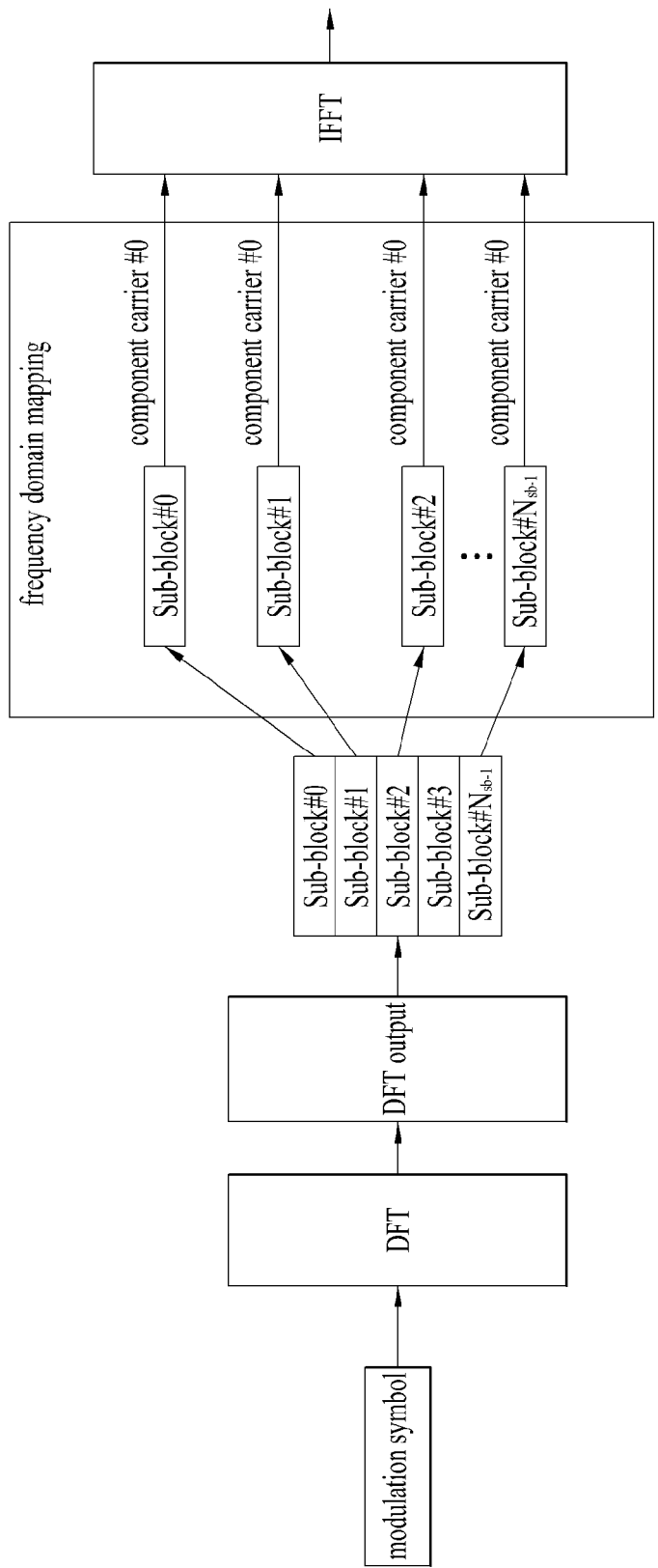
FIGS. 16 to 19 are diagrams to describe a clustered DFT-s-OFDMA scheme.

FIG. 16 is a diagram to describe a clustered DFT-s-OFDMA scheme on a single carrier. For instance, a DFT output may be partitioned into Nsb sub-blocks (sub-blocks #0 to #Nsb−1). When sub-blocks are mapped to a frequency region, the sub-blocks #0 to #NSb−1 are mapped to a single carrier (e.g., carrier of 20 MHz bandwidth, etc.) and each of the sub-blocks may be mapped to a position spaced in the frequency region. And, each of the sub-blocks may be locally mapped to the frequency region.

Figure 17:
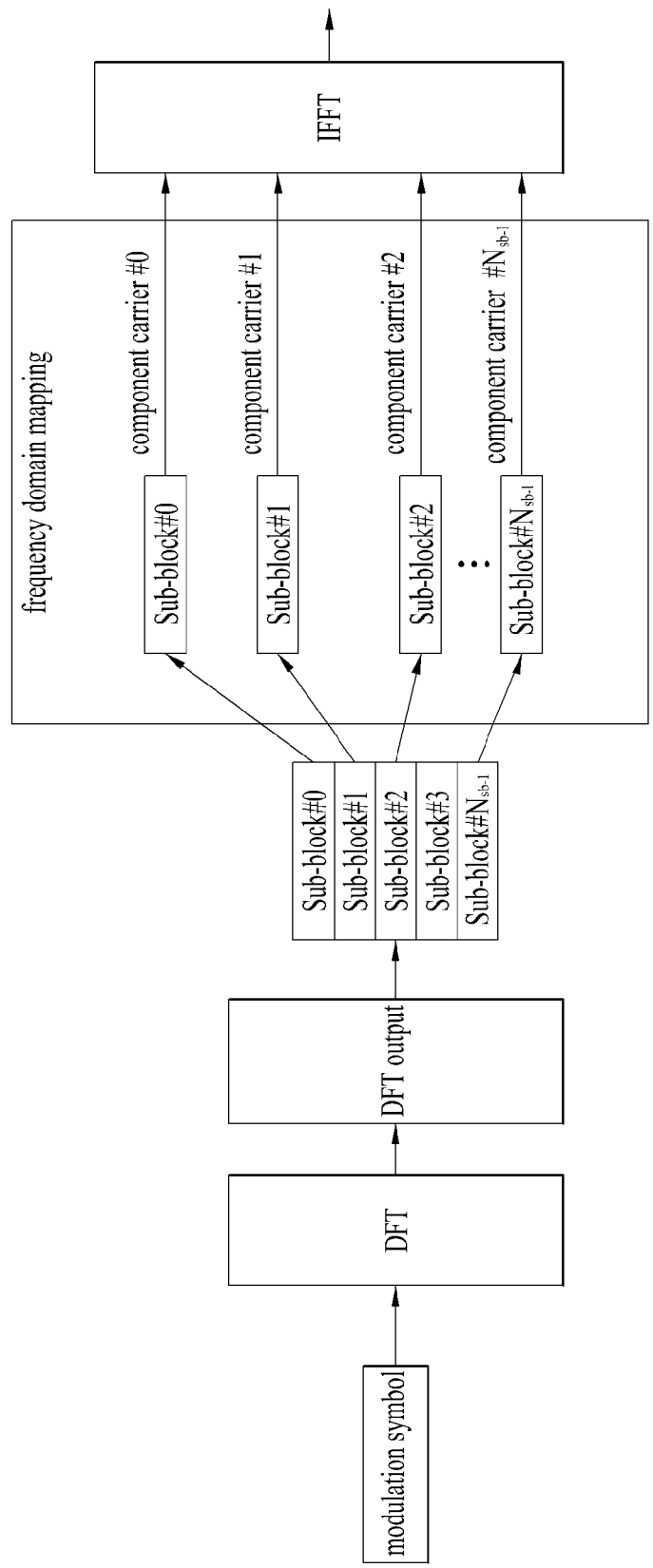
Figure 18:
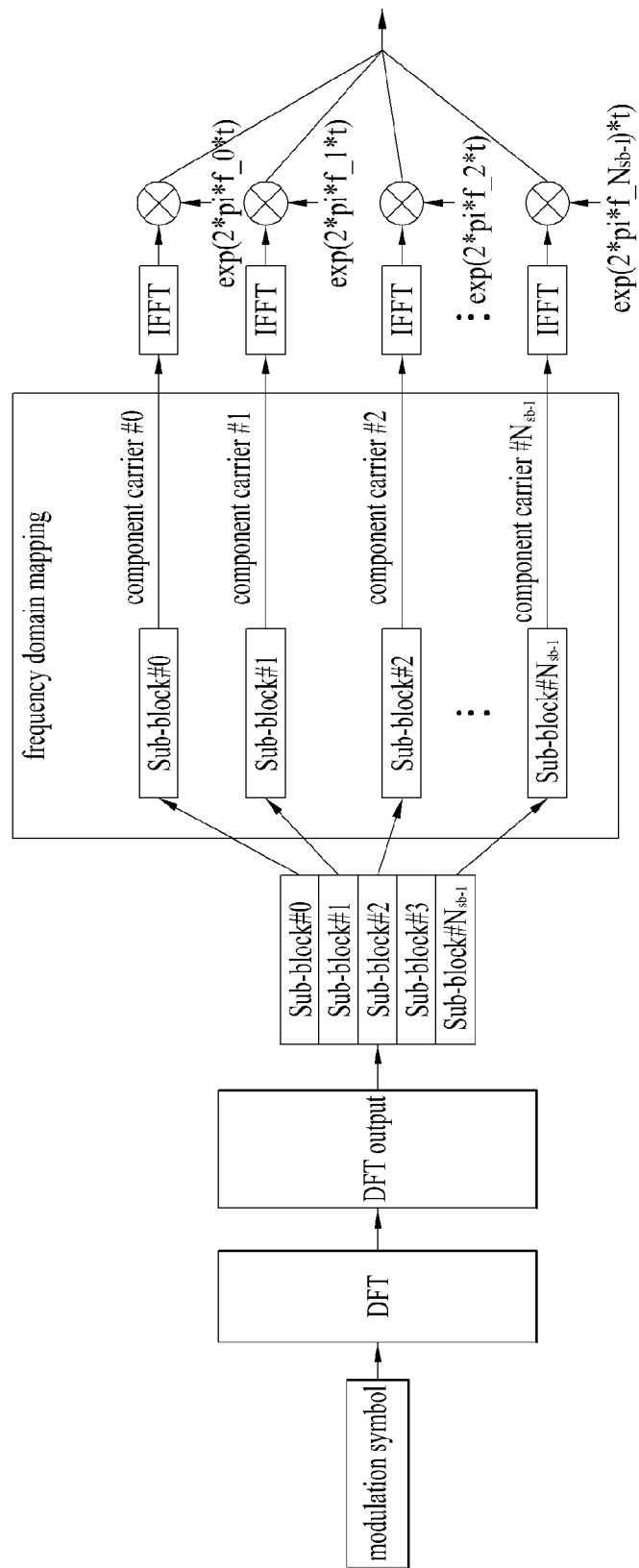

FIG. 17 and FIG. 18 are diagrams to describe a clustered DFT-s-OFDMA scheme on multiple carriers.

In a situation (i.e., frequency bands of multiple carriers (cells) are contiguously assigned) that multiple carriers (or multiple cells) are configured contiguously, if a subcarrier interval between contiguous carriers is aligned, FIG. 17 is a diagram for one example that a signal can be generated through a single IFFT module. For instance, a DFT output may be segmented into Nsb sub-blocks (sub-blocks #0 to #NSb−1). In mapping sub-blocks to a frequency region, the sub-blocks #0 to #NSb−1 can be mapped to component carriers #0 to #NSb−1, respectively [e.g., each carrier (or cell) may have a bandwidth of 20 MHz]. moreover, each of the sub-blocks may be mapped to a frequency region by being localized. And, the sub-blocks mapped to the carriers (or cells) may be transformed into a time-domain signal through a single IFFT module.

In a situation (i.e., frequency bands of multiple carriers (cells) are non-contiguously assigned) that multiple carriers (or multiple cells) are configured non-contiguously, FIG. 18 is a diagram for one example that a signal is generated using a plurality of IFFT modules. For instance, a DFT output may be segmented into Nsb sub-blocks (sub-blocks #0 to #NSb−1). In mapping sub-blocks to a frequency region, the sub-blocks #0 to #NSb−1 can be mapped to carriers #0 to #NSb−1, respectively [e.g., each carrier (or cell) may have a bandwidth of 20 MHz]. moreover, each of the sub-blocks may be mapped to a frequency region by being localized. And, the sub-blocks mapped to the carriers (or cells) may be transformed into a time-domain signal through the IFFT modules, respectively.

If the clustered DFT-s-OFDMA on the single carrier mentioned with reference to FIG. 16 is called intra-carrier (or intra-cell) DFT-s-OFDMA, the DFT-s-OFDMA on the multiple carriers (or cells) mentioned with reference to FIG. 17 or FIG. 18 may be called inter-carrier (or inter-cell) DFT-s-OFDMA. Thus, the intra-carrier DFT-s-OFDMA and the inter-carrier DFT-s-OFDMA may be interchangeably usable.

Figure 19:
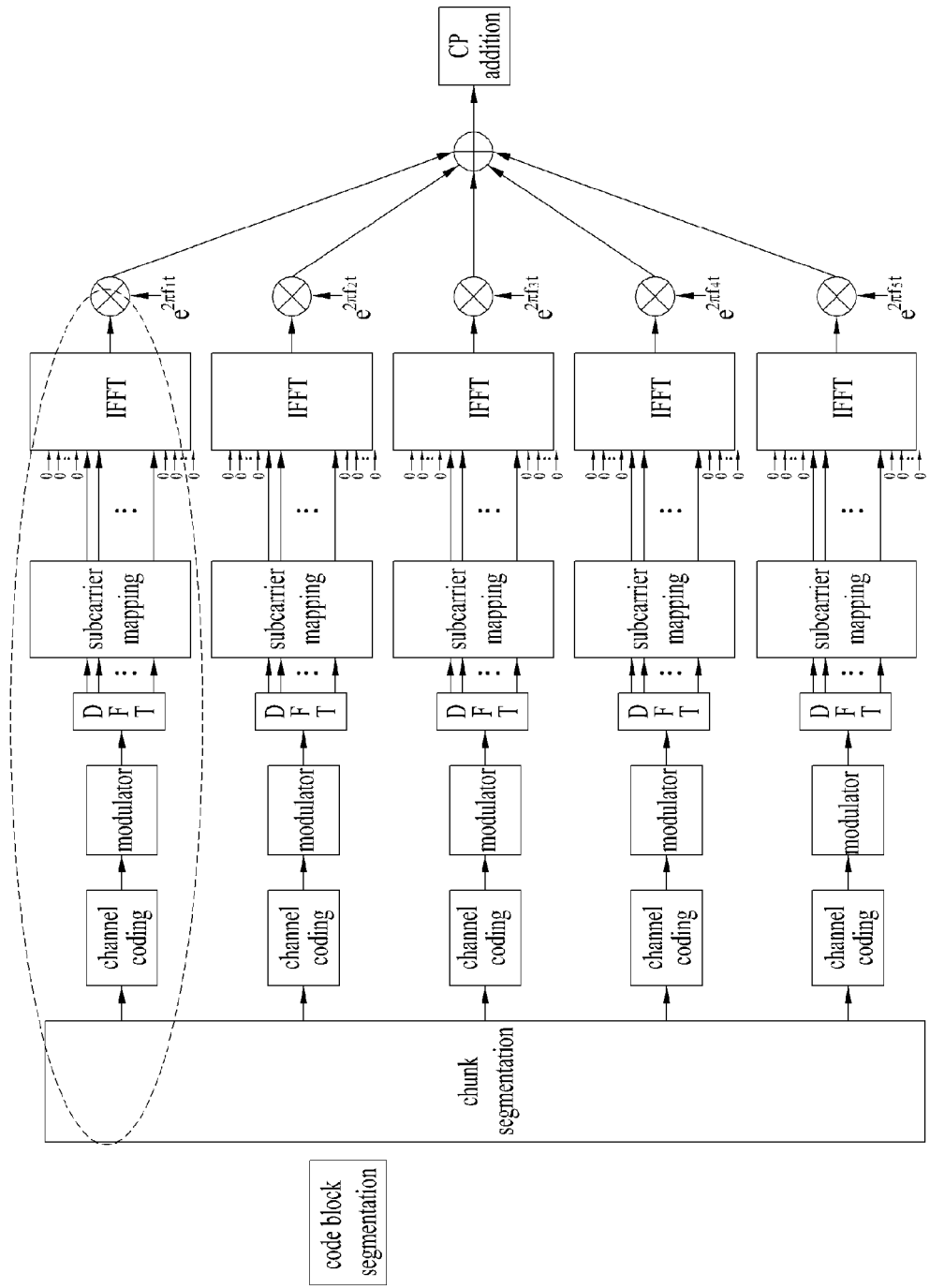

FIG. 19 is a diagram to describe a chuck-specific DFT-s-OFDMA scheme of performing DFT processing, frequency domain mapping and IFFT processing by chunk unit. The chunk-specific DFT-s-OFDMA may be called Nx SC-FDMA. A code block segmented signal is chunk-segmented into parts and channel coding and modulation is performed on each of the parts. The modulated signal undergoes the DFT processing, the frequency domain mapping and the IFFT processing in the same manner described with reference to FIG. 12, outputs from the respective IFFTs are added up, and CP may be added thereto. The Nx SC-FDMA scheme mentioned with reference to FIG. 19 may be applicable to a contiguous multi-carrier (or multi-cell) case and a non-contiguous multi-carrier (or multi-cell) case both.

Structure of MIMO System

Figure 20:
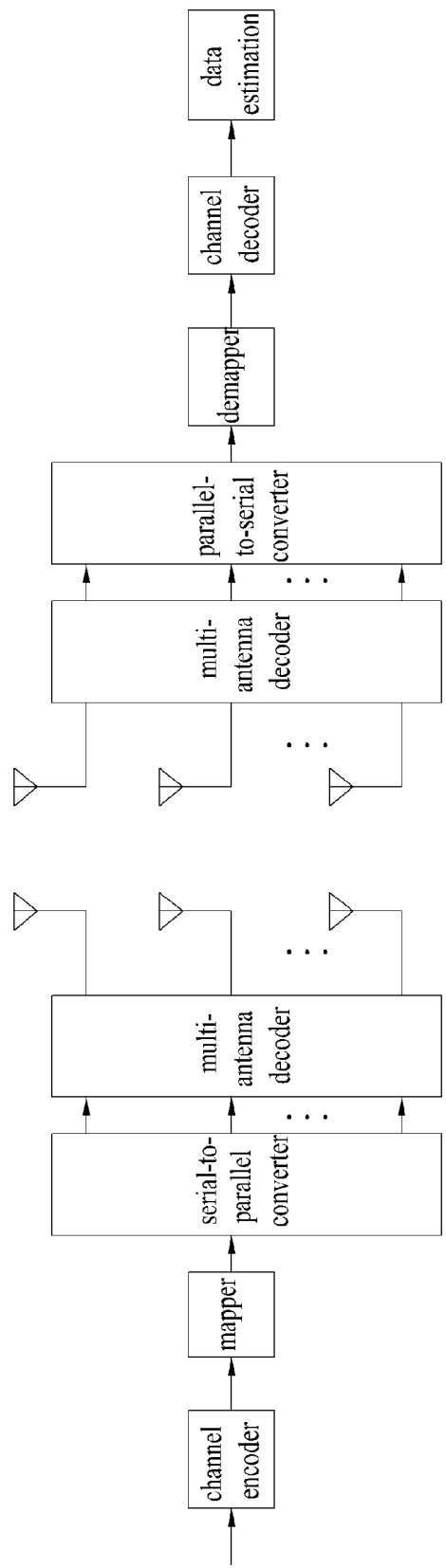
FIG. 20 is a diagram for a structure of an MIMO system.

FIG. 20 is a diagram to illustrate a basic structure of MIMO system having multiple Tx antennas and/or multiple Rx (receiving) antennas. Each block shown in FIG. 20 conceptionally indicates a function or operation in a transmitting/receiving end for MIMO transmission.

A channel encoder shown in FIG. 20 indicates an operation of attaching a redundancy bit to an input data bit, whereby effect of noise and the like from a channel can be reduced. A mapper indicates an operation of converting data bit information to data symbol information. A serial-to-parallel converter indicates an operation of converting serial data to parallel data. A multi-antenna encoder indicates an operation of transforming a data symbol into a time-spatial signal. A multi-antenna of a transmitting end plays a role in transmitting this time-spatial signal on a channel, while a multi-antenna of a receiving end plays a role in receiving the signal on the channel.

A multi-antenna decoder shown in FIG. 20 indicates an operation of transforming the received time-spatial signal into each data symbol. A parallel-to-serial converter indicates an operation of converting a parallel signal to a serial signal. A demapper indicates an operation of transforming a data symbol to a bit information. A decoding operation for a channel code is performed by a channel decoder, whereby data can be estimated.

The MIMO transceiving system mentioned in the above description may have a single or several codewords spatially in accordance with a space multiplexing ratio. A case of having a single codeword spatially is called a single codeword (SCW) structure. And, a case of having several codewords is called a multiple codeword (MCW) structure.

Figure 21:
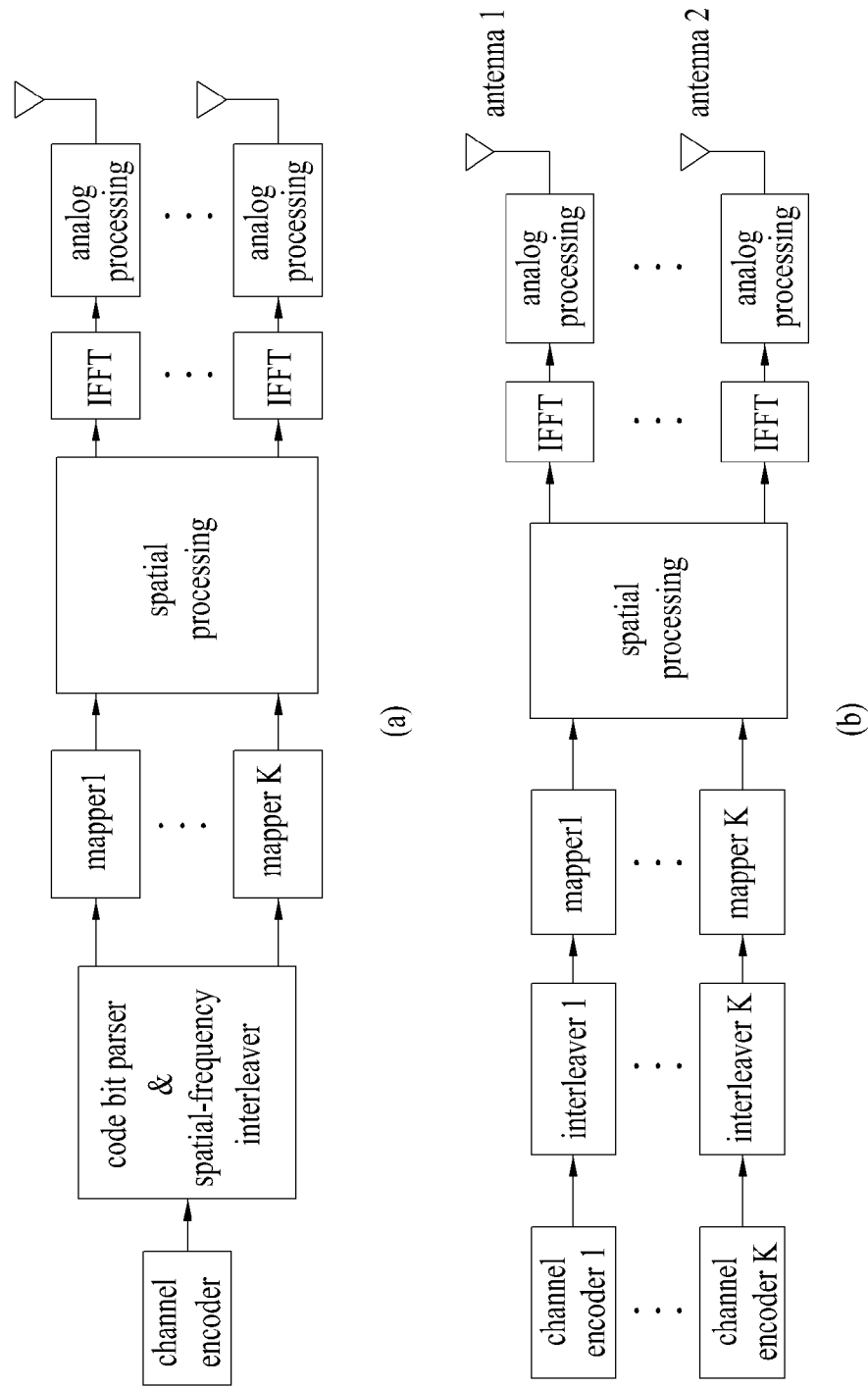
FIG. 21 is a block diagram to describe functionality of an MIMO system.

FIG. 21 (a) is a block diagram to represent functionality of a transmitting end of an MIMO system having the SCW structure. And, FIG. 21 (b) is a block diagram to represent functionality of a transmitting end of an MIMO system having the MCW structure.

Codebook Based Precoding Scheme

In order to support multi-antenna transmission, it may be able to apply precoding of appropriately distributing transmission information to each antenna in accordance with a channel status and the like. A codebook based precoding scheme means the scheme performed in a following manner. First of all, a set of precoding matrixes is determined in a transmitting end and a receiving end. Secondly, the transmitting end measures channel information from the transmitting end and then feeds back information (i.e., a precoding matrix index (PMI)) indicating what is a most appropriate precoding matrix to the transmitting end. Finally, the transmitting end applies an appropriate precoding to a signal transmission based on the PMI. Since the appropriate precoding matrix is selected from the previously determined precoding matrix set, although an optimal precoding is not always applied, this is more advantageous than the explicit feedback of optimal precoding information actually carried on channel information in reducing feedback overhead.

Figure 22:
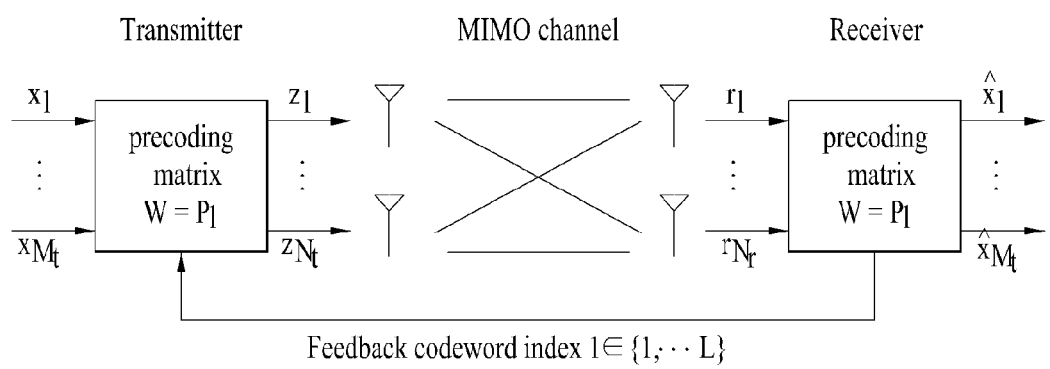
FIG. 22 is a diagram to describe a basic concept of codebook based precoding.

FIG. 22 is a diagram to describe basic concept of codebook based precoding.

According to a codebook based precoding scheme, a transmitting and a receiving end share codebook information including a prescribed number of precoding matrixes in accordance with a transmission rank, the number of antennas and the like. In particular, in case that feedback information is finite, it is able to use the precoding based codebook scheme. The receiving end measures a channel status via a received signal and is then able to deed back information (i.e., indexes of the corresponding precoding matrixes) on the finite number of preferred precoding matrixes based on the above-mentioned codebook information to the transmitting end. For instance, the receiving end is able to select an optimal precoding matrix in a manner of measuring a received signal by ML (maximum likelihood) or MMSE (minimum mean square error) scheme. FIG. 22 shows that the receiving end transmits the precoding matrix information per codeword to the transmitting end, by which the present invention may be non-limited.

Having received the feedback information from the receiving end, the transmitting end may be able to select a specific precoding matrix from the codebook based on the received information. Having selected the precoding matrix, the transmitting end performs a precoding in a manner of multiplying layer signals, of which number corresponds to the transmission rank, by the selected precoding matrix and may be then able to transmit a precoded transmission signal via a plurality of antennas. In the precoding matrix, the number of rows is equal to that of the antennas and the number of columns is equal to a rank value. Since the rank value is equal to the number of the layers, the number of the columns is equal to the number of layers. For instance, if the number of the Tx antennas and the number of the transmission layers are 4 and 2, respectively, the precoding matrix can be configured with 4×2 matrix. Information transmitted via each layer can be mapped to each antenna via the precoding matrix.

Having received the signal precoded and transmitted by the transmitting end, the receiving end is able to reconstruct the received signal by performing a processing inverse to that of the precoding performed by the transmitting end. Generally, since the precoding matrix meets such a unitary matrix (U) condition as $U*U^H=I$, the inverse processing of the precoding may be performed in a manner of multiplying the received signal by Hermit matrix ($P^H$) of the precoding matrix (P) used for the precoding of the transmitting end.

For instance, Table 4 in the following indicates a codebook used for a downlink transmission using 2 Tx antennas in 3GPP LTE Release-8/9 and Table 5 indicates a codebook used for a downlink transmission using 4 Tx antennas in 3GPP LTE Release-8/9.

TABLE 4

| Codebook | Number of rank | |
|---|---|---|
| index | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

TABLE 5

| Codebook index | $u_n$ | Number of layers u | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |

TABLE 5-continued

| Codebook index | $u_n$ | Number of layers u | | | |
|---|---|---|---|---|---|
| | | 1 | 2 | 3 | 4 |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 5, $W_n^{\{s\}}$ is obtained from a set $\{S\}$ configured from a formula expressed as $W_n = I - 2u_n u_n^H / u_n^H u_n$. In this case, I indicates 4×4 unitary matrix and $u_n$ indicates a value given by Table 5.

Referring to Table 4, when a codebook for 2 Tx antennas has total 7 precoding vectors/matrixes, since a unitary matrix is provided for an open-loop system, there are total 6 precoding vectors/matrixes for the precoding of a closed-loop system. Moreover, referring to Table 5, a codebook for 4 Tx antennas has total 64 precoding vectors/matrixes.

The above-mentioned codebooks have such a common property as a constant modulus (CM) property, a nested property, a constrained alphabet property and the like. According to the CM property, each element of every precoding matrix within a codebook does not contain '0' and is configured to have the same size. According to the nested property, a precoding matrix of a low rank is designed to be configured with a subset of a specific column of a precoding matrix of a high rank. According to the constrained alphabet property, each element of every precoding matrix within a codebook is constrained. For instance, each element of a precoding matrix is limited only to an element (±1) used for BPSH (binary phase shift keying), elements (±1,±j) used for QPSK (quadrature phase shift keying), or elements $$\left(\pm 1, \pm j, \pm \frac{(1+j)}{\sqrt{2}}, \pm \frac{(-1+j)}{\sqrt{2}}\right)$$

used for 8-PSK. In the example of the codebook shown in Table 5, since alphabet of each element of every precoding matrix within the codebook is configured with $$\left\{\pm 1, \pm j, \pm \frac{(1+j)}{\sqrt{2}}, \pm \frac{(-1+j)}{\sqrt{2}}\right\},$$

it may be represented as having the constrained alphabet property.

Feedback Channel Structure

Basically, since a base station is unable to know information on a DL channel in FDD system, channel information fed back by a user equipment is used for a DL transmission. In case of the legacy 3GPP LTE Release-8/9 system, it is able to feed back DL channel information via PUCCH or PUSCH. In case of the PUCCH, channel information is periodically fed back. In case of the PUSCH, channel information is aperiodically fed back in accordance with a request made by a base station. Moreover, feedback of channel information may be performed in a manner of feeding back the channel information on a whole frequency band (i.e., wideband (WB)) or the channel information on a specific number of RBs (i.e., subband (SB)).

Extended Antenna Configuration

FIG. 23 shows examples of configuration of 8 Tx (transmitting) antennas.

FIG. 23 (a) shows a case that N antennas configure independent channels without being grouped, which is generally called ULA (uniform linear array). In case that the number of antennas is small, the ULA configuration may be available. In case that the number of antennas is big, multiple antennas are arranged in a manner being spaced apart from each other. Hence, it may be insufficient for a space of a transmitter and/or receiver to configure independent channels.

FIG. 23 (b) shows an antenna configuration (i.e., paired ULA) of ULA type in which 2 antennas form a pair. In this case, an associated channel is established between a pair of the antennas and may be independent from that of antennas of another pair.

Meanwhile, unlike the fact that the legacy 3GPP LTE Release-8/9 system uses 4 Tx antennas in DL, the 3GPP LTE Release-10 system is able to use 8 Tx antennas in DL. In order to apply this extended antenna configuration, it is necessary to install several Tx antennas in insufficient space. Thus, the ULA antenna configuration shown FIG. 23 (a) or FIG. 23 (b) may become inappropriate. Therefore, it may be able to consider applying a dual-polarized (or cross-polarized) antenna configuration shown in FIG. 23 (c). In case of this configuration of Tx antennas, even if a distance 'd' between antennas is relatively short, it is able to configure independent channels by lowering correlation. Therefore, data transmission of high throughput can be achieved.

Codebook Structures

If a transmitting end and a receiving end share a pre-defined codebook with each other, it is able to lower an overhead for the receiving end to feedback precoding information to be used for MIMO transmission from the transmitting end. Hence, it is able to apply efficient precoding.

For one example of configuring a pre-defined codebook, it is able to configure a precoder matrix using DFT (discrete Fourier transform) matrix or Walsh matrix. Alternatively, it is able to configure precoders of various types by combination with a phase shift matrix, a shift diversity matrix or the like.

In configuring a DFT matrix based codebook, n×n DFT matrix can be defined as Formula 3.

$$DFTn:\ D_n(k, \ell) = \frac{1}{\sqrt{n}} \exp(-j2\pi k\ell/n),\ k, \ell = 0, 1, \ldots, n-1 \quad \text{[Formula 3]}$$

In the DFT matrix of Formula 3, a single matrix exists for a specific size n only. Hence, in order to appropriately define and use various kinds of precoding matrixes in accordance with a situation, it may be able to consider configuring to use a rotated version of the DFTn matrix in addition. One example of the rotated DFTn matrix is shown in Formula 4.

$$\text{rotated } DFTn: D_n^{(G,g)}(k,\ell) = \frac{1}{\sqrt{n}} \exp(-j2\pi k(\ell + g/G)/n), \quad \text{[Formula 4]}$$

$$k, \ell = 0, 1, \ldots, n-1, g = 0, 1, \ldots, G.$$

In case that the DFT matrix shown in Formula 4 is configured, it is able to create G rotated DFTn matrixes. And, the created matrixes may meet the property of the DFT matrix.

In the following description, a householder-based codebook structure is explained. The householder-based codebook structure may mean the codebook configured with householder matrix. In particular, the householder matrix is the matrix used for householder transform. The householder transform is a sort of linear transformation and may be usable in performing QR decomposition. The QR decomposition may mean that a prescribed matrix is decomposed into an orthogonal matrix (Q) and an upper triangular matrix (R). The upper triangular matrix means a square matrix of which components below main diagonal components are all zeros. One example of the 4×4 householder matrix is shown in Formula 5.

$$M_1 = I_4 - 2u_0 u_1^H / \|u_0\|^2 = \frac{1}{\sqrt{4}} * \begin{bmatrix} 1 & 1 & 1 & 1 \\ 1 & 1 & -1 & -1 \\ 1 & -1 & 1 & -1 \\ 1 & -1 & -1 & 1 \end{bmatrix}, \quad \text{[Formula 5]}$$

$$u_0^T = [1 \quad -1 \quad -1 \quad -1]$$

It is able to create 4×4 unitary matrix having the CM property by householder transformation. Like the codebook for the 4 Tx antennas shown in Table 5, n×n precoding matrix is created using the householder transformation and a column subset of the created precoding matrix can be configured to be used as a precoding matrix for a transmission of a rank smaller than n.

Multi-Codebook Based Precoder Creation

A precoding operation used for a multi-antenna transmission may be explained as an operation of mapping a signal transmitted via layer(s) to antenna(s). In particular, by X×Y precoding matrix, Y transmission layers (or streams) can be mapped to X Tx antennas.

In order to configure $N_t \times R$ precoding matrix used in transmitting R streams (i.e., Rank R) via $N_t$ Tx antennas, a transmitting end receives a feedback of at least one precoding matrix index (PMI) from a receiving end and is then able to configure a precoder matrix. Formula 6 shows one example of a codebook configured with $n_c$ matrixes.

$$P_{N_t \times R}(k) \in \{P_1^{N_t \times R}, P_2^{N_t \times R}, P_3^{N_t \times R}, \ldots, P_{n_c}^{N_t \times R}\} \quad \text{[Formula 6]}$$

In Formula 6, k indicates a specific resource index (e.g., a subcarrier index, a virtual resource index, a subband index, etc.). Formula 6 may be configured in form of Formula 7.

$$P_{N_t \times R}(k) = \begin{bmatrix} P_{M_t \times R, 1} \\ P_{M_t \times R, 2} \end{bmatrix}, N_t = 2 \cdot M_t \quad \text{[Formula 7]}$$

In Formula 7, $P_{M_t \times R, 2}$ may be configured in form of shifting $P_{M_t \times R, 1}$ by a specific complex weight $w_2$. Hence, if a difference between $P_{M_t \times R, 1}$ and $P_{M_t \times R, 2}$ is represented as a specific complex weight, it may be expressed as Formula 8.

$$P_{N_t \times R}(k) = \begin{bmatrix} w_1 \cdot P_{M_t \times R, 1} \\ w_2 \cdot P_{M_t \times R, 1} \end{bmatrix} \quad \text{[formula 8]}$$

Moreover, Formula 8 may be represented as Formula 9 using Kroneker product ($\otimes$).

$$P_{N_t \times R, n, m}(k) = \begin{bmatrix} w_1 \\ w_2 \end{bmatrix} \otimes P_{M_t \times R, 1} = W_n \otimes P_m \quad \text{[Formula 9]}$$

Kroneker product is an operation for 2 matrixes in random size. As a result of Kroneker product operation, it is able to obtain a block matrix. For instance, Kroneker product of an m×n matrix A and a p×q matrix B (i.e., A⊗B) may be represented as Formula 10. In Formula 10, $a_{mn}$ indicates an element of the matrix A and $b_{pq}$ indicates an element of the matrix B.

[Formula 10]

$$A \otimes B = \begin{bmatrix} a_{11}b_{11} & a_{11}b_{12} & \cdots & a_{11}b_{1q} & \cdots & \cdots & a_{1n}b_{11} & a_{1n}b_{12} & \cdots & a_{1n}b_{1q} \\ a_{11}b_{21} & a_{11}b_{22} & \cdots & a_{11}b_{2q} & \cdots & \cdots & a_{1n}b_{21} & a_{1n}b_{22} & \cdots & a_{1n}b_{2q} \\ \vdots & \vdots & \ddots & \vdots & & & \vdots & \vdots & \ddots & \vdots \\ a_{11}b_{p1} & a_{11}b_{p2} & \cdots & a_{11}b_{pq} & \cdots & \cdots & a_{1n}b_{p1} & a_{1n}b_{p2} & \cdots & a_{1n}b_{pq} \\ \vdots & \vdots & \vdots & \vdots & \ddots & & \vdots & \vdots & & \vdots \\ \vdots & \vdots & \vdots & \vdots & & \ddots & \vdots & \vdots & & \vdots \\ a_{m1}b_{11} & a_{m1}b_{12} & \cdots & a_{m1}b_{1q} & \cdots & \cdots & a_{mn}b_{11} & a_{mn}b_{12} & \cdots & a_{mn}b_{1q} \\ a_{m1}b_{21} & a_{m1}b_{22} & \cdots & a_{m1}b_{2q} & \cdots & \cdots & a_{mn}b_{21} & a_{mn}b_{22} & \cdots & a_{mn}b_{2q} \\ \vdots & \vdots & \ddots & \vdots & & & \vdots & \vdots & \ddots & \vdots \\ a_{m1}b_{p1} & a_{m1}b_{p2} & \cdots & a_{m1}b_{pq} & \cdots & \cdots & a_{mn}b_{p1} & a_{mn}b_{p2} & \cdots & a_{mn}b_{pq} \end{bmatrix}$$

A partial matrix $$\begin{bmatrix} w_1 \\ w_2 \end{bmatrix}$$

of precoding and $P_{M_t \times R, 1}$ in Formula 9 may be independently fed back from a receiving end. And, a transmitting end is able to configure and use a precoder like Formula 8 or Formula 9 using each feedback information. In case of applying the form of Formula 8 or Formula 9, W is always configured in form of 2×1 vector and may be configured in form of a codebook shown I Formula 11.

$$W \in \begin{bmatrix} 1 \\ e^{j\frac{2\pi}{N}i} \end{bmatrix}, i = 0, \ldots, N-1 \qquad \text{[Formula 11]}$$

In Formula 11, N indicates the total number of precoding vectors contained in the codebook and i may be used as an index of a vector. In order to obtain proper performance by minimizing feedback overhead, i may be usable by being set to 2, 4 or 8. Moreover, $P_{M_t \times R,1}$ may be configured as a codebook for 4 Tx antennas or a codebook for 2 Tx antennas. For this, the codebook of Table 4 or Table 5 (e.g., the codebook for 2 or 4 Tx antennas defined in 3GPP LTE Release-8/9) is usable. And, $P_{M_t \times R,1}$ may be configured in rotated DFT form as well.

Moreover, a matrix W may be available in form of 2×2 matrix. Formula 12 shows one example of the 2×2 matrix W.

$$P_{N_t \times 2R,n,m}(k) = \begin{bmatrix} w_1 & w_3 \\ w_2 & w_4 \end{bmatrix} \otimes P_{M_t \times R,1} = W_n \otimes P_m, N_t = 2 \cdot M_t \qquad \text{[Formula 12]}$$

In case of the configuration of Formula 12, if a maximum rank of the codebook $P_{M_t \times R,1}$ is R, it may be able to design a codebook of a rank up to 2R. For instance, in case of using the codebook shown in Table 4 as $P_{M_t \times R,1}$, according to Formula 9, it may be usable up to 4 (R=4) as a maximum rank. On the other hand, according to Formula 12, it may be able to use a maximum rank up to 8 (2R=8). Hence, in the system configured with 8 Tx antennas, it is able to configure a precoder capable of 8×8 transmission. In this case, W may be configured in form of a codebook shown in Formula 13.

$$W \in \begin{bmatrix} 1 & 1 \\ e^{j\frac{2\pi}{N}i} & -e^{j\frac{2\pi}{N}i} \end{bmatrix}, i = 0, \ldots, N-1 \qquad \text{[Formula 13]}$$

The precoder configuring method according to Formula 9 or Formula 12 may apply differently in accordance with each rank. For instance, the method of Formula 9 is used for a case of a rank equal to or lower than 4 (R≤4). And, the method of Formula 12 may be used for a case of a rank equal to or higher than 5 (R≥5). Alternatively, the method of Formula 9 is used only for a case of a rank 1 (R=1). In other cases (i.e., rank 2 or higher (R≥2)), it may be able to use the method of Formula 12. The W and P mentioned in association with Formula 9 and Formula 12 may be fed back to have the property as shown in Table 6.

TABLE 6

| Case | W/P |
|---|---|
| Frequency granularity 1 | One of two matrixes may be configured to be fed back on subband and the other may be configured to be fed back on wideband. |
| Frequency granularity 2 | One of two matrixes may be configured to be fed back on nest-M band and the other may be configured to be fed back on wideband. |
| Time granularity | One of two matrixes may be configured to be fed back by periods N and the other may be configured to be fed back by periods M. |
| Feedback channel 1 | One of two matrixes may be configured to be fed back on PUSCH and the other may be configured to be fed back on PUCCH. |
| Feedback channel 2 | In case of feedback on PUSCH, one (e.g., W) of two matrixes may be configured to be fed back on subband and the other (e.g., P) may be configured to be fed back on wideband. In case of feedback on PUCCH, both Q and P may be configured to be fed back on wideband. |
| Unequal protection | One (e.g., P) of two matrixes may be configured to be coded at a more reliable rating rate and the other (e.g., W) may be configured to be coded at a relatively low coding rate. |
| Alphabet restriction 1 | Alphabet of a matrix W may be configured to be constrained by BPSK and alphabet of a matrix P may be configured to be constrained by QPSK or 8 PSK. |
| Alphabet restriction 2 | Alphabet of a matrix W may be configured to be constrained by QPSK and alphabet of a matrix P may be configured to be constrained by QPSK or 8 PSK. |

In the following description, a multi-codebook based precoder having the nested property is explained.

First of all, it is able to configure a codebook using the method of Formula 9 and the method of Formula 12 appropriately. Yet, in some cases, it may be impossible to configure a precoder unless using two kinds of combinations. To solve this problem, it may be able to configure and use a precoder as shown in Formula 14.

$$P_{N_t \times N_t,n,m} = \begin{bmatrix} w_1 & w_3 \\ w_2 & w_4 \end{bmatrix} \otimes P_{M_t \times M_t} = W_n \otimes P_m, N_t = 2 \cdot M_t \qquad \text{[Formula 14]}$$

A precoder for a case that a rank value is equal to the number of Tx antennas (R=$N_t$) is configured using the $P_{N_t \times N_t}$ obtained from Formula 14 and a column subset of the configured precoder may be usable as a precoder for a lower rank. If the precoder is configured in the above manner, the nested property can be met to simplify the CQI calculation. In Formula 14, $P_{N_t \times N_t,n,m}$ indicates the precoder in case of R=$N_t$. In this case, for example, a subset configured with $0^{th}$ and $2^{nd}$ columns of $P_{N_t \times N_t,n,m}$ may be usable for a precoder for R=2, which can be represented as $P_{N_t \times N_t,n,m}(0,2)$. In this case, $P_{M_t \times M_t}$ may be configured with a rotated DFT matrix or a codebook of another type.

Meanwhile, in order to raise a diversity gain in an open-loop environment, based on the precoder configured in the above manner, it is able to maximize the beam diversity gain by exchanging to use a precoder in accordance with a specific resource. For instance, in case of using the precoder according to the method of Formula 9, a method of applying a precoder in accordance with a specific resource may be represented as Formula 15.

$$P_{N_t \times R, n, m}(k) = W_{k \bmod n_c} \otimes P_{k \bmod m_c} \quad \text{[Formula 15]}$$

In Formula 15, k indicates a specific resource region. A precoding matrix for a specific resource region k is determined by such a modulo operation as Formula 15. In this case, $n_c$ and $m_c$ may indicate a size or subset of a codebook for matrix W and a size or subset of a codebook for a matrix P, respectively.

Like Formula 15, if cycling is applied to each of the two matrixes, complexity may increase despite maximizing a diversity gain. Hence, long-term cycling may be set to be applied to a specific matrix and short-term cycling may be set to be applied to the rest of the matrixes.

For instance, the matrix W may be configured to perform a modulo operation in accordance with a physical resource block (PRB) index and the matrix P may be configured to perform a modulo operation in accordance with a subframe index. Alternatively, the matrix W may be configured to perform a modulo operation in accordance with a subframe index and the matrix P may be configured to perform a modulo operation in accordance with a physical resource block (PRB) index.

For another instance, the matrix W may be configured to perform a modulo operation in accordance with a physical resource block (PRB) index and the matrix P may be configured to perform a modulo operation in accordance with a subband index. Alternatively, the matrix W may be configured to perform a modulo operation in accordance with a subband index and the matrix P may be configured to perform a modulo operation in accordance with a physical resource block (PRB) index.

Moreover, a precoder cycling using a modulo operation is applied to one of the two matrixes only and the other may be fixed to use.

Codebook Configuration for 8 Tx Antennas

In the 3GPP LTE Release-10 system having an extended antenna configuration (e.g., 8 Tx antennas), the feedback scheme used by the legacy 3GPP LTE Release-8/9 may be applied in a manner of being extended. For instance, it is able to feed back such channel state information (CSI) as RI (Rank Indicator), PMI (Precoding Matrix Index), CQI (Channel Quality Information) and the like. In the following description, a method of designing a dual precoder based feedback codebook usable for a system supportive of an extended antenna configuration is explained. In the dual precoder based feedback codebook, in order to indicate a precoder to be used for MIMO transmission of a transmitting end, a receiving end may be able to transmit a precoding matrix index (PMI) to the transmitting end. In doing so, a precoding matrix may be indicated by combination of 2 different PMIs. In particular, the receiving end feeds back 2 different PMIs (i.e., $1^{st}$ PMI and $2^{nd}$ PMI) to the transmitting end. Subsequently, the transmitting end determines the precoding matrix indicated by the combination of the $1^{st}$ and $2^{nd}$ PMIs and is then able to apply the determined precoding matrix to the MIMO transmission.

In designing the dual precoder based feedback codebook, it may be able to consider 8-Tx antenna MIMO transmission, single user-MIMO (SU-MIMO) and multiple user-MIMO (MU-MIMO) supports, compatibility with various antenna configurations, codebook design references, codebook size and the like.

As a codebook applicable to 8-Tx antenna MIMO transmission, it may be able to consider designing a feedback codebook. In particular, this feedback codebook supports SU-MIMO only in case of a rank higher than 2, is optimized for both SU-MIMO and MU-MIMO in case of a rank equal to or lower than 2, and is compatible with various antenna configurations.

In case of MU-MIMO, user equipments participating in MU-MIMO are preferably separated in correlation domain. Hence, the codebook for MU-MIMO needs to be designed to correctly operate on a channel having high correlation. Since DFT vectors provide good performance on a channel having high correlation, it may be able to consider having DFT vector contained in a codebook set of a rank up to a rank-2. In high scattering propagation environment (e.g., an indoor environment having many reflective waves, etc.) capable of producing many space channels, SU-MIMO operation may be preferred as the MIMO transmission scheme. Hence, it may be able to consider designing a codebook for a rank higher than the rank-2 to have god performance in separating multiple layers.

In designing a precoder for MIMO transmission, it is preferable that one precoder structure has good performance for various antenna configurations (e.g., low-correlation, high-correlation, cross-pole, etc.). In arrangement of 8 Tx antennas, a cross-polarized array having an antenna interval of 4λ may be formed in a low-correlation antenna configuration, a ULA having an antenna interval of 0.5λ may be formed in a high-correlation antenna configuration, or a cross-polarized array having an antenna interval of 0.5λ may be formed in a cross-polarized antenna configuration. The DFT based codebook structure may be able to provide good performance for the high-correlation antenna configuration. Meanwhile, block diagonal matrixes may be more suitable for the cross-polarized antenna configuration. Hence, in case that a diagonal matrix is introduced into a codebook for 8 Tx antennas, it is able to configure a codebook that provides god performance for all antenna configurations.

As mentioned in the foregoing description, the codebook design reference is to meet the unitary codebook, the CM property, the constrained alphabet, the proper codebook size, the nested property and the like. This applies to the 3GPP LTE Release-8/9 codebook design. And, it may be able to consider applying such a codebook design reference to the 3GPP LTE Release-10 codebook design supportive of the extended antenna configuration.

Regarding the codebook size, it is necessary to increase the codebook size to sufficiently support the advantage in using 8 Tx antennas. In order to obtain a sufficient precoding gain from 8 Tx antennas in environment with low correlation, a codebook in large size (e.g., a codebook in size over 4 bits for Rank 1 or Rank 2) may be required. In order to obtain a precoding gain in an environment with high correlation, a codebook in 4-bit size may be sufficient. Yet, in order to achieve a multiplexing gain of MU-MIMO, it may be able to increase a codebook size for Rank 1 or Rank 2.

Based on the above description, general structures of a codebook for 8 Tx antennas are explained as follows.

Codebook Structure (1)

In applying multi-granular feedback, a method of configuring a codebook for 8 Tx antennas by combination of 2 base matrixes and a method of configuring the combination of 2 base matrixes using an inner product are described as follows.

First of all, a method of using an inner product of 2 base matrixes may be represented as Formula 16.

$$W = \tilde{W}_1 \tilde{W}_2 \quad \text{[Formula 16]}$$

In case that codebook for 8 Tx antennas is represented in form of an inner product, a $1^{st}$ base matrix may be represented as a diagonal matrix shown in Formula 17 for a co-polarized antenna group.

$$\tilde{W}_1 = \begin{bmatrix} W_1 & 0 \\ 0 & W_1 \end{bmatrix} (W_1 : 4 \times N) \quad \text{[Formula 17]}$$

Moreover, in case that a $2^{nd}$ base matrix is used to adjust a relative phase between polarizations, the $2^{nd}$ base matrix may be represented using an identity matrix. For an upper rank of a codebook for 8 Tx antennas, the $2^{nd}$ base matrix may be represented as Formula 18. In Formula 18, a relation between a coefficient '1' of a $1^{st}$ row of the $2^{nd}$ base matrix and a coefficient 'a' or '-a' of a $2^{nd}$ row thereof may be able to reflect the adjustment of a relative phase between orthogonal polarizations.

$$\tilde{W}_2 = \begin{bmatrix} I & I \\ aI & -aI \end{bmatrix} (I : N \times N) \quad \text{[Formula 18]}$$

Hence, if the codebook for 8 Tx antennas is represented using the $1^{st}$ base matrix and the $2^{nd}$ base matrix, it can be represented as Formula 19.

$$W = \begin{bmatrix} W_1 & 0 \\ 0 & W_1 \end{bmatrix} \begin{bmatrix} I & I \\ aI & -aI \end{bmatrix} = \begin{bmatrix} W_1 & W_1 \\ aW_1 & -aW_1 \end{bmatrix} \quad \text{[Formula 19]}$$

The codebook expressed using the inner product like Formula 19 can be simplified into Formula 20 using Kroneker product.

$$W = W_2 \otimes W_1 (W_1 : 4 \times N, W_2 : 2 \times M) \quad \text{[Formula 20]}$$

In Formula 20, a precoding matrix included in a codebook W includes 4*2 rows and N*M columns. Hence, it can be used as a codebook for 8 Tx antennas and transmission of Rank 'N*M'. For instance, in case of configuring a codebook for 8 Tx antennas and transmission of Rank R, if $W_2$ is configured with 2×M, a value N for $W_1$ becomes R/M. For instance, in case of configuring a codebook for 8 Tx antennas and transmission of Rank 4, if $W_2$ is configured with 2×2 (i.e., M=2) matrix (e.g., the matrix shown in Formula 13), $W_1$ may apply 4×2 (i.e., N=R/M=4/2=2) matrix (e.g., DFT matrix).

Codebook Structure (2)

Another method of configuring a codebook for 8 Tx antennas by combination of 2 base matrixes is described as follows. Assuming that the 2 base matrixes are set to W1 and W2, respectively, a precoding matrix W for configuring a codebook may be defined in form of W1* W2. For Rank 1 to Rank 8, W1 may be able to have such a form of a block diagonal matrix as $$\begin{bmatrix} X & 0 \\ 0 & X \end{bmatrix}.$$

For Rank 1 to Rank 4, X corresponding to a block of a block diagonal matrix W1 may be configured with a matrix in size of 4×Nb. And, 16 4Tx DFT beams can be defined for the X. In this case, beams indexes may be given as 0, 1, 2, . . . , and 15, respectively. For each W1, the adjacent overlapping beams may be usable to reduce an edge effect in frequency-selective precoding. Hence, even if a codebook is configured using the same W1 for an identical or different W2, optimal performance can be secured for several subbands.

For Rank 1 and Rank 2, X corresponding to a block diagonal matrix W1 may be configured with a matrix in size of 4×4 (i.e., Nb=4). For each of Rank 1 and Rank 2, 8 W1 matrixes can be defined. And, one W1 may include beams overlapping with the adjacent W1. In case that beam indexes are given as 0, 1, 2, . . . , and 15, respectively, for example, it is able to configure 8 W1 matrixes, of which beams overlapping with the adjacent W1 matrix, such as {0, 1, 2, 3}, {2, 3, 4, 5}, {4, 5, 6, 7}, {6, 7, 8, 9}, {8, 9, 10, 11}, {10, 11, 12, 13}, {12, 13, 14, 15}, and {14, 15, 0, 1}. For instance, a W1 codebook for Rank 1 or Rank 2 may be defined as Formula 21.

$$X^{(n)} = \frac{1}{2} \times \begin{bmatrix} 1 & 0 & 0 & 0 \\ 0 & e^{j\frac{\pi}{4}n} & 0 & 0 \\ 0 & 0 & e^{j(2)\frac{\pi}{4}n} & 0 \\ 0 & 0 & 0 & e^{j(3)\frac{\pi}{4}n} \end{bmatrix} \quad \text{[Formula 21]}$$

$$\begin{bmatrix} 1 & 1 & 1 & 1 \\ 1 & e^{j\frac{\pi}{8}} & e^{j(2)\frac{\pi}{8}} & e^{j(3)\frac{\pi}{8}} \\ 1 & e^{j(2)\frac{\pi}{8}} & e^{j(2)(2)\frac{\pi}{8}} & e^{j(3)(2)\frac{\pi}{8}} \\ 1 & e^{j(3)\frac{\pi}{8}} & e^{j(2)(3)\frac{\pi}{8}} & e^{j(3)(3)\frac{\pi}{8}} \end{bmatrix},$$

$$n = 0, 1, 2, \ldots, 7$$

$$W_1^{(n)} = \begin{bmatrix} X^{(n)} & 0 \\ 0 & X^{(n)} \end{bmatrix},$$

$$CB_1 = \{W_1^{(0)}, W_1^{(1)}, W_1^{(2)}, \ldots, W_1^{(7)}\}$$

In Formula 21, X(n) corresponding to a block of a block diagonal matrix $W1^{(n)}$ is defined and a W1 codebook ($CB_1$) can be configured with 8 different W1's.

Considering the selection and common-phase component of W2, the selection of 4 kinds of different matrixes is possible for Rank 1 and 4 kinds of different QPSK co-phases are applicable for Rank 1. Hence, total 16 W2 matrixes can be defined. For instance, the W2 codebook ($CB_2$) for Rank 1 can be configured as Formula 22.

$$W_2 \in CB_2 = \quad \text{[Formula 22]}$$

$$\left\{ \frac{1}{\sqrt{2}} \begin{bmatrix} Y \\ Y \end{bmatrix}, \frac{1}{\sqrt{2}} \begin{bmatrix} Y \\ jY \end{bmatrix}, \frac{1}{\sqrt{2}} \begin{bmatrix} Y \\ -Y \end{bmatrix}, \frac{1}{\sqrt{2}} \begin{bmatrix} Y \\ -jY \end{bmatrix} \right\}$$

$$Y \in \left\{ \begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \begin{bmatrix} 0 \\ 0 \\ 0 \\ 1 \end{bmatrix} \right\}$$

For Rank 2, the selection of 4 kinds of different matrixes is possible and 2 kinds of different QPSK co-phases are applicable. Hence, total 8 W2 matrixes can be defined. For instance, the W2 codebook ($CB_2$) for Rank 2 can be configured as Formula 23.

$$W_2 \in CB_2 = \left\{ \frac{1}{\sqrt{2}} \begin{bmatrix} Y & Y \\ Y & -Y \end{bmatrix}, \frac{1}{\sqrt{2}} \begin{bmatrix} Y & Y \\ jY & -jY \end{bmatrix} \right\}$$ [Formula 23]

$$Y \in \left\{ \begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \begin{bmatrix} 0 \\ 0 \\ 0 \\ 1 \end{bmatrix} \right\}$$

Subsequently, for Rank 3 and Rank 4, X corresponding to a block diagonal matrix W1 may be configured with a matrix in size of 4×8 (i.e., Nb=8). For each of Rank 3 and Rank 4, 4 W1 matrixes can be defined. And, one W1 may include beams overlapping with the adjacent W1. In case that beam indexes are given as 0, 1, 2, ..., and 15, respectively, for example, it is able to configure 4 W1 matrixes, of which beams overlapping with the adjacent W1 matrix, such as {0, 1, 2, ..., 7}, {4, 5, 6, ..., 11}, {8, 9, 10, ..., 15}, and {12, ..., 15, 0, ..., 3}. For instance, a W1 codebook for Rank 3 or Rank 4 may be defined as Formula 24.

$$X^{(n)} = \frac{1}{2} \times \begin{bmatrix} 1 & 0 & 0 & 0 \\ 0 & (j)^n & 0 & 0 \\ 0 & 0 & (-1)^n & 0 \\ 0 & 0 & 0 & (-j)^n \end{bmatrix}$$ [Formula 24]

$$\begin{bmatrix} 1 & 1 & 1 & \ldots & 1 \\ 1 & e^{j\frac{\pi}{8}} & e^{j(2)\frac{\pi}{8}} & \ldots & e^{j(7)\frac{\pi}{8}} \\ 1 & e^{j(2)\frac{\pi}{8}} & e^{j(2)(2)\frac{\pi}{8}} & \ldots & e^{j(7)(2)\frac{\pi}{8}} \\ 1 & e^{j(3)\frac{\pi}{8}} & e^{j(2)(3)\frac{\pi}{8}} & \ldots & e^{j(7)(3)\frac{\pi}{8}} \end{bmatrix},$$

$n = 0, 1, 2, 3$ $$W_1^{(n)} = \begin{bmatrix} X^{(n)} & 0 \\ 0 & X^{(n)} \end{bmatrix},$$

$CB_1 = \{W_1^{(0)}, W_1^{(1)}, W_1^{(2)}, W_1^{(3)}\}$

In Formula 24, X(n) corresponding to a block of a block diagonal matrix $W1^{(n)}$ is defined and a W1 codebook ($CB_1$) can be configured with 4 different W1's.

Considering the selection and common-phase component of W2, the selection of 8 kinds of different matrixes is possible for Rank 3 and 2 kinds of different QPSK co-phases are applicable for Rank 3. Hence, total 16 W2 matrixes can be defined. For instance, the W2 codebook ($CB_2$) for Rank 3 can be configured as Formula 25.

$$W_2 \in CB_2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\}$$ [Formula 25]

$(Y_1, Y_2) \in$ $$\left\{ \begin{matrix} (e_1[e_1 \ e_5]), (e_2[e_2 \ e_6]), \\ (e_3[e_3 \ e_7]), (e_4[e_4 \ e_8]), \\ (e_5[e_1 \ e_5]), (e_6[e_2 \ e_6]), \\ (e_7[e_3 \ e_7]), (e_8[e_4 \ e_8]) \end{matrix} \right\}$$

In Formula 24, $e_n$ indicates 8×1 vector, $n^{th}$ element has a value of 1, and the rest of elements mean a selection vector having a value of 0.

For Rank 4, the selection of 4 kinds of different matrixes is possible and 2 kinds of different QPSK co-phases are applicable. Hence, total 8 W2 matrixes can be defined. For instance, the W2 codebook ($CB_2$) for Rank 4 can be configured as Formula 26.

$$W_2 \in CB_2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\}$$ [Formula 26]

$Y \in \{[e_1 \ e_5], [e_2 \ e_6], [e_3 \ e_7], [e_4 \ e_8]\}$

For Rank 5 to Rank 8, X corresponding to a block of a block diagonal matrix W1 can be configured with DFT matrix in size of 4×4 and one W1 matrix can be defined. W2 may be defined as a product of a matrix $$\begin{bmatrix} I & I \\ I & -I \end{bmatrix}$$

and a row selection matrix in a fixed size of 8×r. For Rank 5, since selection of 4 kinds of different matrixes is possible, 4 W2 matrixes can be defined. For Rank 6, since selection of 4 kinds of different matrixes is possible, 4 W2 matrixes can be defined. For Rank 7, since selection of 1 kind of a matrix is possible, one W2 matrix can be defined. For Rank 8, since selection of 1 kind of a matrix is possible, one W2 matrix can be defined. In this case, the matrix $$\begin{bmatrix} I & I \\ I & -I \end{bmatrix}$$

is introduced to enable all polarized groups for each transmission layer to be identically used and good performance may be expected for a transmission of a high rank having a spatial channel having more scattering. In this case, the I means an identity matrix.

For instance, the W1 codebook or the W2 codebook for Rank 5 to Rank 8 can be defined as Formula 27.

$$X = \frac{1}{2} \times \begin{bmatrix} 1 & 1 & 1 & 1 \\ 1 & j & -1 & -j \\ 1 & -1 & 1 & -1 \\ 1 & -j & -1 & j \end{bmatrix},$$ [Formula 27]

$$W_1 = \begin{bmatrix} X & 0 \\ 0 & X \end{bmatrix},$$

$CB_1 = \{W_1\}$ $$W_2 \in CB_2 = \left\{ \frac{1}{\sqrt{2}} \begin{bmatrix} I_4 & I_4 \\ I_4 & -I_4 \end{bmatrix} Y \right\}$$

In Formula 27, the W1 codebook for Rank 5 to Rank 8 is configured with one W1 matrix only. $I_4$ in the W2 codebook for Rank 5 to Rank 8 means an identity matrix in size of 4×4. In Formula 27, a matrix Y can be defined as one of Formula 28 to Formula 31 for example.

The matrix Y for Rank 5 can be defined as Formula 28.

$Y \in$ [Formula 28]

$$\left\{ \begin{matrix} [e_1 \ e_2 \ e_3 \ e_4 \ e_5], [e_2 \ e_3 \ e_4 \ e_5 \ e_6], \\ [e_3 \ e_4 \ e_5 \ e_6 \ e_7], [e_4 \ e_5 \ e_6 \ e_7 \ e_8], \end{matrix} \right\}$$

The matrix Y for Rank 6 can be defined as Formula 29.

$Y \in$ [Formula 29]

$$\{[e_1\ e_2\ e_3\ e_4\ e_5\ e_6],[e_2\ e_3\ e_4\ e_5\ e_6\ e_7],\\ [e_3\ e_4\ e_5\ e_6\ e_7\ e_8],[e_4\ e_5\ e_6\ e_7\ e_8\ e_9],\}$$

The matrix Y for Rank 7 can be defined as Formula 30.

$Y=[e_1 e_2 e_3 e_4 e_5 e_6 e_7]$ [Formula 30]

The matrix Y for Rank 8 can be defined as Formula 31.

$Y=I_8$ [Formula 31]

In Formula 31, the $I_8$ means 8×8 identity matrix.

As mentioned in the foregoing description, the numbers of W1's, which can be defined for each of Rank 1 to Rank 8, are added up to result in 28 (=8+8+4+4+1+1+1+1).

Based on the above-mentioned description, explained is a method for a transmitting end to use partial antenna ports in case of transmitting CSI-RS (channel state information reference signal) as a technology based 3D MIMO system in which a 2-dimensional active antenna system (2D-AAS) proposed in the present invention is installed.

Figure 24:
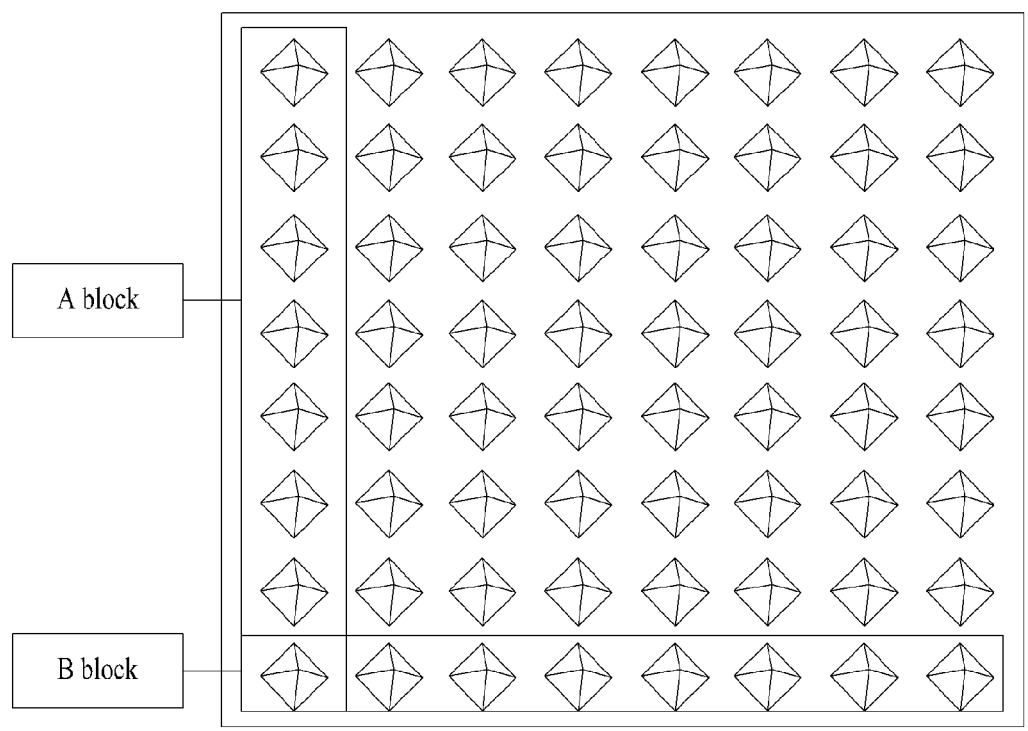
FIG. 24 is a reference diagram of a 2-dimensional active antenna system according to the present invention.

Referring to FIG. 24, an antenna system that utilizes AAS is described. After LTE Rel-12, the antenna system utilizing the AAS shown in FIG. 24 has been discussed. Since each antenna in the AAS corresponds to an active antenna including an active circuit, an antenna pattern can be changed depending on a situation. Thus, it is more efficient in reducing interference or performing beamforming. Moreover, if the AAS is established in two dimensions (i.e., 2D-AAS), in aspect of the antenna pattern, a main lobe of the antenna is adjusted more efficiently in 3 dimensions. Thus, it is possible to actively change a transmitting beam depending on a location of the receiving end. Accordingly, the 2D-AAS can be established as a system having multiple antennas in a manner of arranging antennas vertically and horizontally as shown in FIG. 24.

Moreover, if the 2D-AAS is introduced, a transmitting end needs to transmit CSI-RS in order to inform a receiving end of a channel from the transmitting end to the receiving end. In this regard, in the legacy LTE system (i.e., system before LTE/LTE-A release 11), CSI-RS is designed as 2 ports, 4 ports, or 8 ports CSI-RS. In each n-ports CSI-RS, n resource elements should be used in one RB. Thus, if the 2D-AAS has total 64 antennas by arranging 8 antennas in a vertical direction and 8 antennas in a horizontal direction, 64 REs are used in one RB for CSI-RS according to a conventional scheme. In this case, it may cause a problem that CSI-RS overhead increases depending on the number of antennas. To solve the above problem, discussion is ongoing with respect to a method of estimating channels from remaining ports using partial CSI-RS ports.

Hereinafter, for convenience of explanation, it is assumed that channels from 2D-AAS to a receiving end may be expressed as Kronecker product as shown in Formula 32.

$$H = \begin{bmatrix} H_T^{(1)} \\ H_T^{(2)} \\ \vdots \\ H_T^{(j)} \\ \vdots \\ H_T^{(N_R)} \end{bmatrix} = \begin{bmatrix} H_V^{(1)} \otimes H_H^{(1)} \\ H_V^{(2)} \otimes H_H^{(2)} \\ \vdots \\ H_V^{(j)} \otimes H_H^{(j)} \\ \vdots \\ H_V^{(N_R)} \otimes H_H^{(N_R)} \end{bmatrix}$$ [Formula 32]

In Formula 32, H means entire channels from a transmitting end to a receiving end and $H_T^{(j)}$ means a channel from the transmitting end to $j^{th}$ receiving antenna. $H_V^{(j)}$ and $H_H^{(j)}$ mean a channel from a vertical direction of an antenna element (or port) to $j^{th}$ antenna in the receiving end and a channel from a horizontal direction of an antenna element (or port) to the $j^{th}$ antenna in the receiving end, respectively. Referring to FIG. 24, $H_V^{(j)}$ means a channel from an antenna in A block to the $j^{th}$ antenna in the receiving end on the assumption that there are antennas in A block only. And, $H_H^{(j)}$ means a channel from an antenna in B block to the $j^{th}$ antenna in the receiving end on the assumption that there are antennas in B block only.

For convenience of explanation, the present invention is described on the assumption that there is one random receiving antenna. However, all processes can be equally applied to a case that there are multiple antennas. That is, the present invention is described based on only a channel from a transmitting end to one random receiving antenna without index (j) as shown in Formula 33. However, Formula 33 is only to explain the present invention and the invention can be also applied to a case in which an actual channel is different from Formula 33.

$H_T=H_V \otimes H_H$ [Formula 33]

According to the legacy wireless communication system, two CSI-RSs are configured in a manner of configuring one CSI-RS with $N_V$ antenna ports in the vertical direction as A block in FIG. 24 and one CSI-RS with $N_H$ antenna ports in the horizontal direction as B block in FIG. 24. After measuring two received CSI-RSs, the receiving end may estimate a channel by performing the Kronecker product on two channel matrices as shown in Formula 32. Here, $N_V$ is the number of antennas in the vertical direction and $N_H$ is the number of antennas in the horizontal direction. Such a scheme in the legacy wireless communication system has an advantage of informing the receiving end of a channel from 64-port using existing 2, 4 or 8-port CSI-RS only.

However, as it can be seen in FIG. 24, in case of using two 8-port CSI-RSs, one port is repeatedly transmitted since A block overlaps with B block in part. In other words, the receiving end receives a channel from the one port twice. In this case, a scheme of transmitting one 8-port CSI-RS and one 7-port CSI-RS can be considered but it may cause a problem of additionally creating the 7-port CSI-RS, which does not exist in the current LTE.

Therefore, the present invention proposes a method of facilitating channel estimation by using a different antenna port for CSI-RS 1-port, which is repeatedly transmitted since it belongs to the vertical direction of the antenna port and the horizontal direction of the antenna port at the same time as mentioned in the foregoing description. In particular, since the actual channel is not formed in the same manner as Kronecker product operation as shown in Formula 32, the present invention has an advantage of using the remaining CSI-RS 1-port for more accurate channel estimation.

According to the present invention, first of all, $k^{th}$ row is selected from an antenna domain by the transmitting end in the 2D-AAS for the horizontal direction of the antennas. And, $l^{th}$ column is selected from the antenna domain for the vertical direction of the antennas. Both of the k and l may be previously determined between the transmitting end and the receiving end. Alternatively, they may be informed through RRC signaling or CSI-RS configuration.

Thereafter, the transmitting end configures two CSI-RSs. One of them is $N_V$-port CSI-RS (hereinafter referred to as V-CSI-RS) and the other is $N_H$-port CSI-RS (hereinafter referred to as H-CSI-RS). CSI-RS used in the current LTE can be reused since the number of antennas in the vertical direction and the number of antennas in the horizontal direction are assumed to be 1, 2, 4, or 8 in the current LTE system. However, in case of $N_V$=1, only one $N_H$-port H-CSI-RS is configured. And, in case of $N_H$=1, only one $N_V$-port V-CSI-RS is configured. Thus, it is preferred to apply the present invention to a case of $N_V$>1 and $N_H$>1, except a case of $N_V$=1 or $N_H$=1.

According to the present invention, $N_H$ antenna ports in the $k^{th}$ row selected from the antenna domain may be transmitted through $N_H$-port H-CSI-RS and $N_V$−1 antenna ports except $k^{th}$ antenna port among antenna ports in the $l^{th}$ column selected from the antenna domain may be transmitted through $N_V$-port V-CSI-RS. In this case, one port unused in $N_V$-port V-CSI-RS is used for one among antenna ports unselected from the antenna domain. Moreover, information on one antenna port with respect to the selected specific row (i.e., $k^{th}$ row) may be previously determined between the transmitting end and the receiving end. Alternatively, the information may be informed through RRC signaling or CSI-RS configuration.

Figure 25:
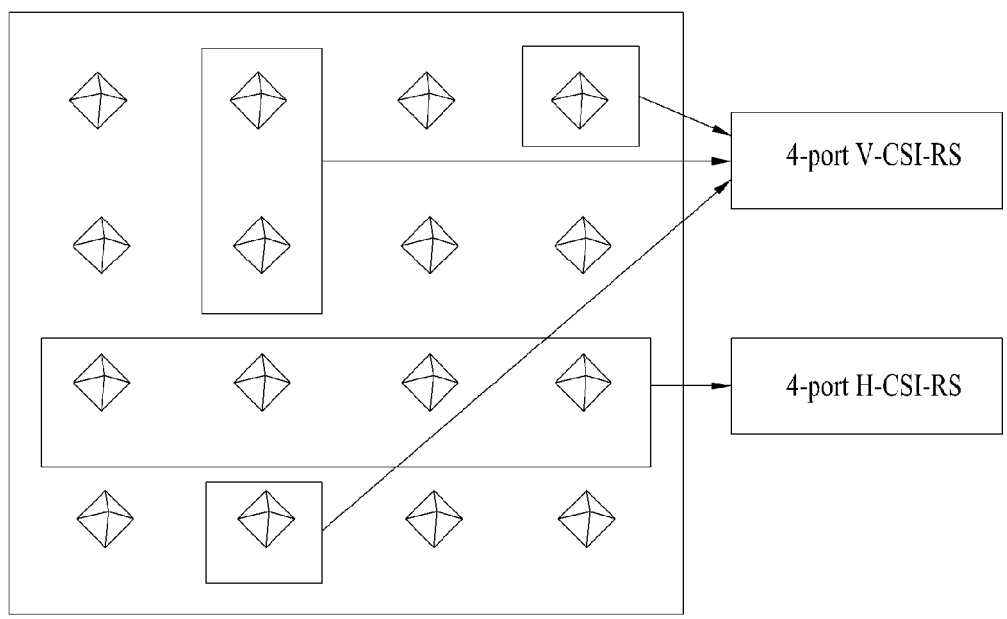
FIG. 25 is a reference diagram for explaining an embodiment of the present invention.

FIG. 25 is a reference diagram to describe a method of transmitting CSI-RS according to an embodiment of the present invention. Referring to FIG. 25, the number of antennas in the vertical direction and the number of antennas in the horizontal direction are 4, respectively. And, the total number of ports is 16 For example, after designating two 4-port CSI-RSs, a transmitter transmits antenna ports in a $2^{nd}$ row through 4-port H-CSI-RS and antenna ports among antenna ports in a $2^{nd}$ column except a $2^{nd}$ antenna port though 4-port V-CSI-RS.

In this case, one port unused in V-CSI-RS may transmit CSI-RS with respect to a specific antenna port among the rest of antenna ports, which are not transmitted through H-CSI-RS and V-CSI-RS in an entire domain antenna configuration of the antenna domain. FIG. 24 illustrates an example of using it for an antenna port corresponding to (4, 4) location. However, in some cases, CSI-RS with respect to a specific antenna port configured through preset standard/ RRC signaling may be transmitted. For example, it may be configured to transmit CSI-RS with respect to an antenna port having a lowest correlation with a selected antenna port or CSI-RS with respect to an antenna port, which is physically located farthest away from selected antennas.

Moreover, according to the present invention, CSI-RS 1-port, which is supposed to be transmitted repeatedly, is not transmitted. Instead, power boosting can be performed on CSI-RS having non-transmitted CSI-RS port as much as transmission power used for transmitting the CSI-RS 1-port.

In particular, $N_H$ antenna ports in the $k^{th}$ row selected from the antenna domain are transmitted through $N_H$-port H-CSI-RS and $N_V$−1 antenna ports except the $k^{th}$ antenna port among antenna ports in the $l^{th}$ column selected from the antenna domain are transmitted through $N_V$-port V-CSI-RS. In this case, the power can be reduced since CDM (code division multiplexing) is performed on $N_V$−1 ports instead of $N_V$ ports in $N_V$-port V-CSI-RS transmission. Thus, in the case of transmitting $N_V$-port V-CSI-RS, CDM is performed on $N_V$−1 ports and power boosting is performed as much as when CDM is performed on $N_V$ ports.

More particularly, it is currently configured that CDM is performed on CSI-RS in a manner of making a bundle of two REs. Thus, if CDM is performed on $N_V$−1 ports using $N_V$-port V-CSI-RS, half of power may be used in some two REs. Therefore, in this case, two REs having the reduced power may be transmitted using double power or all the REs used in V-CSI-RS may be power-boosted as much as $$\sqrt{\frac{N_V}{N_V-1}}.$$

Moreover, since UE knows which CSI-RS transmits one less port, the UE is able to estimate how much power is used for CSI-RS power boosting.

Furthermore, according to the present invention, when an actual channel is significantly different from the Kronecker product form of the channel shown in Formula 32, the transmitter may use two CSI-RSs corresponding to $N_A$-port H-CSI-RS and $N_B$-port V-CSI-RS. In this case, $N_A$ and $N_B$ needs to satisfy conditions of $N_A \geq N_H$ and $N_B \geq N_V$, respectively. These conditions means that the number of ports defined for H-CSI-RS port is equal to or greater than the number of antennas in the horizontal direction and the number of ports defined for V-CSI-RS port is equal to or greater than the number of antennas in the vertical direction.

Thus, $N_H$ antenna ports in the $k^{th}$ row selected from the antenna domain are transmitted through $N_A$-port H-CSI-RS and $N_V$−1 antenna ports except the $k^{th}$ antenna port among antenna ports in the $l^{th}$ column selected from the antenna domain are transmitted through $N_B$-port V-CSI-RS. And, $N_A$−$N_H$ ports unused in H-CSI-RS and $N_B$−$N_V$+1 ports unused in V-CSI-RS are used for $N_A$−$N_H$+$N_B$−$N_V$+1 ports among ports unused as CSI-RS in the antenna domain.

Information on $N_A$−$N_H$+$N_B$−$N_V$+1 antenna ports may be previously determined between the transmitting end and the receiving end. Alternatively, the information may be informed through RRC signaling or CSI-RS configuration.

Moreover, the present invention can be applied to a case that $N_H$−1 antenna ports except $l^{th}$ antenna port among antenna ports in the $k^{th}$ row selected from the antenna domain are transmitted through $N_H$-port H-CSI-RS and $N_V$ antenna ports in the $l^{th}$ column selected from the antenna domain are transmitted through $N_V$-port V-CSI-RS. In this case, one port unused in $N_H$-port H-CSI-RS may transmit CSI-RS with respect to a specific antenna port among the rest of antenna ports, which are not transmitted through H-CSI-RS and V-CSI-RS in an entire domain antenna configuration of the antenna domain. Further, information on one antenna port with respect to the selected specific row (i.e., $k^{th}$ row) may be previously determined between the transmitting end and the receiving end. Alternatively, the information may be informed through RRC signaling or CSI-RS configuration.

The power boosting may be performed when $N_H$−1 antenna ports except lth antenna port among antenna ports in the $k^{th}$ row selected from the antenna domain are transmitted through $N_H$-port H-CSI-RS and $N_V$ antenna ports in the $l^{th}$ column selected from the antenna domain are transmitted through $N_V$-port V-CSI-RS. In particular, the power can be reduced since CDM is performed on $N_H$−1 ports instead of $N_H$ ports in $N_H$-port H-CSI-RS transmission. In other words, in the case of transmitting $N_H$-port H-CSI-RS, CDM is performed on $N_H$−1 ports and power boosting is performed as much as when CDM is performed on $N_H$ ports.

More particularly, it is currently configured that CDM is performed on CSI-RS in a manner of making a bundle of two REs. Thus, if CDM is performed on $N_H$−1 ports using $N_H$-port H-CSI-RS, half of power may be used in some two REs. Therefore, in this case, two REs having the reduced power may be transmitted using double power or all the REs used in H-CSI-RS may be power-boosted as much as $$\sqrt{\frac{N_H}{N_H-1}}.$$

As mentioned in the foregoing description, since UE knows which CSI-RS transmits one less port, the UE is able to estimate how much power is used for CSI-RS power boosting.

In addition, according to the present invention, when an actual channel is significantly different from the Kronecker product form of the channel shown in Formula 32, the transmitter may use two CSI-RSs corresponding to $N_A$-port H-CSI-RS and $N_B$-port V-CSI-RS. RS. In this case, $N_A$ and $N_B$ needs to satisfy conditions of $N_A \geq N_H$ and $N_B \geq N_V$, respectively.

Therefore, $N_H$-1 antenna ports except lth antenna port among antenna ports in the $k^{th}$ row selected from the antenna domain are transmitted through $N_A$-port H-CSI-RS and $N_V$ antenna ports in the $l^{th}$ column selected from the antenna domain are transmitted through $N_B$-port V-CSI-RS. And, $N_A - N_H + 1$ ports unused in H-CSI-RS and $N_B - N_V$ ports unused in V-CSI-RS are used for $N_A - N_H + N_B - N_V + 1$ ports among ports unused as CSI-RS in the antenna domain.

Information on $N_A - N_H + N_B - N_V + 1$ antenna ports may be previously determined between the transmitting end and the receiving end. Alternatively, the information may be informed through RRC signaling or CSI-RS configuration.

Although the present invention has been described focusing on CSI-RS, it will be described hereinafter centering on CRS. In the current LTE wireless communication system, not only the CSI-RS but also the CRS are defined.

That is, to reduce RS overhead, it is proposed that a base station and a UE (user equipment) combine channels by utilizing both of the CSI-RS and the CRS for CSI measurement at the UE.

After measuring (or estimating) channels using CSI-RS ports and CRS ports, the base station and the UE estimate entire channels by combining channels obtained from the CSI-RS ports and channels obtained from the CRS ports. Such a method of combining channels may be previously defined between the base station and the UE or it may be semi-statically defined through RRC signaling. As an example of the method of combining channels, a final channel can be created through the Kronecker product, which is shown in Formula 33, of the channels obtained from the CSI-RS ports and the channels obtained from the CRS ports.

As an example of the method of combining channels using both of the CSI-RS and the CRS, which is proposed in the present invention, channels in the vertical direction can be transmitted using the CSI-RS ports and channels in the horizontal direction can be transmitted using the CRS ports. In addition, the UE may estimate the entire channels by combining the channels obtained from the CSI-RS ports and the channels obtained from the CRS-ports (for example, the UE may estimate the entire channels through the Kronecker product of the CSI-RS based vertical channels and the CRS based horizontal channels). Thereafter, the UE may calculate RI, PMI, and CQI based on the combined channels and then feed back the calculated RI, PMI, and CQI to the base station.

Figure 26:
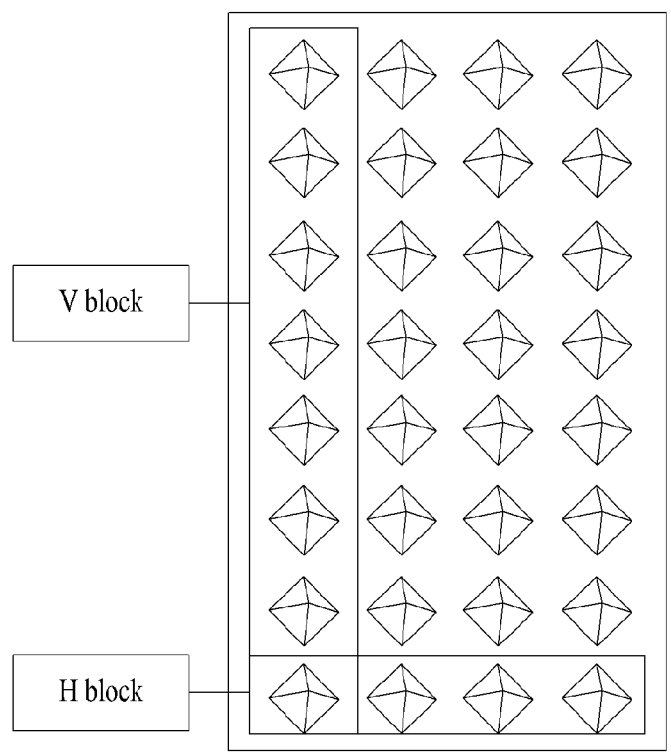
FIGS. 26 and 27 illustrate embodiments for feeding back all channels based on CRS and CSI-RS according to the present invention.

FIG. 26 illustrates an embodiment of channel estimation using CSI-RS and CRS according to the present invention. Referring to FIG. 26, a base station configures one 8 port CSI-RS for a vertical block (hereinafter, referred to as V block) and one 4 port CRS for a horizontal block (hereinafter, referred to as H block) for a UE. The UE estimates channel $H_V$ for the V block from the configured 8 port CSI-RS and channel $H_H$ for the H block from the configured 4 port CRS. Subsequently, the UE estimates entire channels $H_V \otimes H_H$ (or $H_H \otimes H_V$ through the Kronecker product of the two channels. Thereafter, the UE may calculate RI, PMI, and CQI based on the entire combined channels and then feed back the calculated RI, PMI, and CQI to the base station. For convenience of description, FIG. 26 illustrates a case in which antenna ports in the V block and antenna ports in the H block are used. However, it is apparent that the present invention can be applied to a case in which antenna ports in any vertical block instead of the V block and antenna ports in any horizontal block instead of the H block are used.

Moreover, the present invention can also be applied to a case in which horizontal channels are transmitted using CSI-RS ports and vertical channels are transmitted using CRS ports. The UE may estimate the entire channels by combining the horizontal channels obtained from the CSI-RS ports and the vertical channels obtained from the CRS-ports (for example, the UE may estimate the entire channels through the Kronecker product). Thereafter, the UE may calculate RI, PMI, and CQI based on the entire combined channels and then feed back the calculated RI, PMI, and CQI to the base station.

Figure 27:
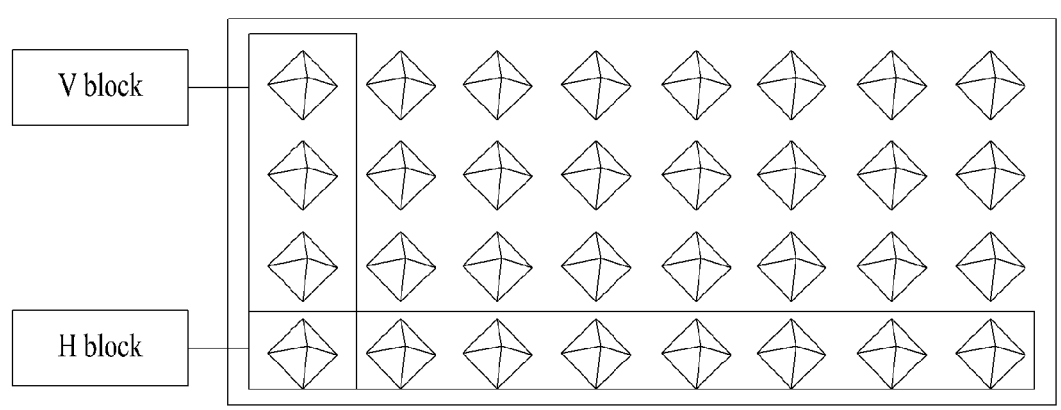

FIG. 27 illustrates another embodiment of channel estimation using CSI-RS and CRS according to the present invention. Referring to FIG. 27, a base station configures one 8 port CSI-RS for a horizontal block (hereinafter, referred to as H block) and one 4 port CRS for a vertical block (hereinafter, referred to as V block) for a UE. The UE estimates channel $H_H$ for the H block from the configured 8 port CSI-RS and channel $H_V$ for the V block from the configured 4 port CRS. Subsequently, the UE estimates entire channels $H_V \otimes H_H$ (or $H_H \otimes H_V$) through the Kronecker product of the two channels. Thereafter, the UE may calculate RI, PMI, and CQI based on the entire combined channels and then feed back the calculated RI, PMI, and CQI to the base station. For convenience of description, FIG. 27 illustrates a case in which antenna ports in the V block and antenna ports in the H block are used. However, it is apparent that the present invention can be applied to a case in which antenna ports in any vertical block instead of the V block and antenna ports in any horizontal block instead of the H block are used.

However, the channel estimation methods of using 8 port CSI-RS and 4 port CRS for different channel blocks with different directions, which are described with reference to FIGS. 26 and 27, cannot be applied in some cases. For instance, if the number of both of vertical and horizontal antenna ports is greater than four, the aforementioned channel estimation methods cannot be applied since the number of maximum CRS ports is defined as four.

Figure 28:
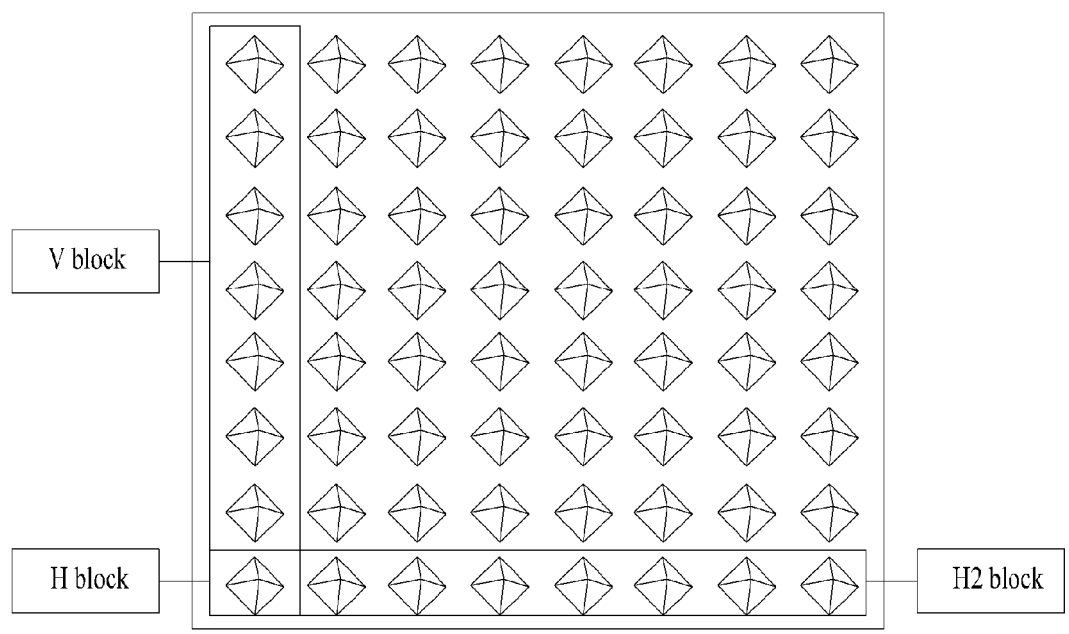
FIG. 28 illustrates an embodiment for using CSI-RS and CRS simultaneously for specific domain antennas according to the present invention.

FIG. 28 is a reference diagram illustrating a case in which the number of both of vertical and horizontal antenna ports is greater than four.

Another embodiment of the present invention is described with reference to FIG. 28. The present invention propose that CRS is used for specific antenna ports among all antenna ports included in one horizontal antenna block, and CSI-RS is used for remaining antenna ports except the specific antenna ports in the horizontal antenna block and antenna ports in one vertical antenna block. On the contrary, CRS may be used for specific antenna ports among all antenna ports included in one vertical antenna block, and CSI-RS may be used for remaining antenna ports except the specific antenna ports in the vertical antenna block and antenna port in one horizontal antenna block. Similarly, in this case, a UE may estimate entire channels after combining channels obtained using the CRS and the CSI-RS. Thereafter, the UE may calculate RI, PMI, and CQI based on the estimated channels and then feed back the calculated RI, PMI, and CQI to a base station.

Referring to FIG. 28, the base station configures one 4 port CRS for a horizontal block (hereinafter referred to as H block), one 4 port CSI-RS for H2 block, and one 8 port CSI-RS for a vertical block (hereinafter referred to as V block) for the UE. The UE estimates channel $H_H$ for H and H2 blocks from the configured 4 port CRS and 4 port CSI-RS and channel $H_V$ for the V block from the configured 8 port CSI-RS. Subsequently, the UE estimates entire channels $H_V \otimes H_H$ (or $H_H \otimes H_V$) through the Kronecker product of the two channels. Thereafter, the UE may calculate the RI, PMI, and CQI based on the estimated channels and then feed back the calculated RI, PMI, and CQI to the base station. For convenience of description, FIG. 28 illustrates a case in which antenna ports in the V block, antenna ports in the H block, and antenna ports in the H2 block are used. However, it is apparent that the present invention can be applied to a case in which antenna ports in any vertical block instead of the V block, antenna ports in any horizontal block instead of the H block, and antenna ports in any horizontal block instead of H2 blocks are used.

Further, in the embodiments of the present invention described with reference to FIGS. 26 to 28, one antenna port overlaps each of the vertical antenna ports and the horizontal antenna ports.

For the antenna port that overlaps each of the vertical antenna ports and the horizontal antenna ports, a reference signal may be configured so that the vertical direction and the horizontal direction overlap each other. However, one port among the vertical or horizontal antenna ports may not be used. Alternatively, the antenna port that overlaps each of the vertical antenna ports and the horizontal antenna ports may be used for another antenna port.

For instance, the V block and H block use one port in common as shown in FIG. 28. That is, one port of 4 port CRS for the V block overlaps with one port of 8 port CSI-RS for the H block. Thus, the base station may not transmit one of the two overlapping ports by setting its power to '0'. Alternatively, the base station may transmit a reference signal for an antenna port except the antenna ports included in the V, H, and H2 blocks using the one of the two overlapping ports. Moreover, such a configuration may be previously defined between the base station and the UE or it may be semi-statically changed through RRC signaling.

Furthermore, whether the aforementioned embodiments of the present invention are applied may be indicated through RRC signaling (in a semi-static manner).

Particularly, a description will be given of a method of indicating whether the embodiments of the present invention are applied through RRC signaling. According to the CSI-RS configuration defined in the current LTE standard, a CRS port quasi co-located with CSI-RS needs to be designated. That is, according to the 3GPP TS 36.331, the standard specification for LTE Release 11, non-zero power CSI-RS configuration is defined as shown in Table 7.

TABLE 7

```
-- ASN1START
CSI-RS-ConfigNZP-r11 ::=      SEQUENCE {
    csi-RS-ConfigNZPId-r11        CSI-RS-ConfigNZPId-r11,
    antennaPortsCount-r11         ENUMERATED {an1, an2, an4, an3},
    resourceConfig-r11            INTEGER {0..31},
    subframeConfig-r11            INTEGER {0..154},
    scramblingIdentity-r11        INTEGER {0..503},
    qcl-CRS-Info-r11              SEQUENCE {
        qcl-ScramblingIdentity-r11    INTEGER (0..503),
        crs-PortsCount-r11            ENUMERATED (n1, n2, n4, spare1),
        mbsfn-SubframeConfigList-r11  CHOICE {
            release                       NULL,
            setup                         SEQUENCE {
                subframeConfigList            NESFN-SubframeConfigList
            }
        }                                                            OPTIONAL    -- Need ON
    }                                                                OPTIONAL    -- Need OR
    ...
}
-- ASN1STOP
```

In Table 7, qcl-CRS-Info-r11 indicates information on CRS quasi co-located with CSI-RS designated in the CSI-RS configuration. Thus, when the embodiments of the present invention are applied based on the assumption that entire channels are estimated (e.g., through the Kronecker product) by combining channels measured through CSI-RS and CRS, a base station needs to inform a UE of CSI-RS and CRS which are bound to each other. Particularly, the base station can indicate the CSI-RS and CRS bound to each other through the following methods A to C.

Method A: Method of estimating channels combined by CSI-RS designated in CSI-RS configuration and CRS quasi co-located with the CSI-RS.

Method B: When channel are estimated by combining channels of CSI-RS and CRS, the CRS is designated as CRS of a serving cell.

Method C: Both of the methods A and B are promised in advance and their application is semi-statically indicated through RRC signaling.

Figure 29:
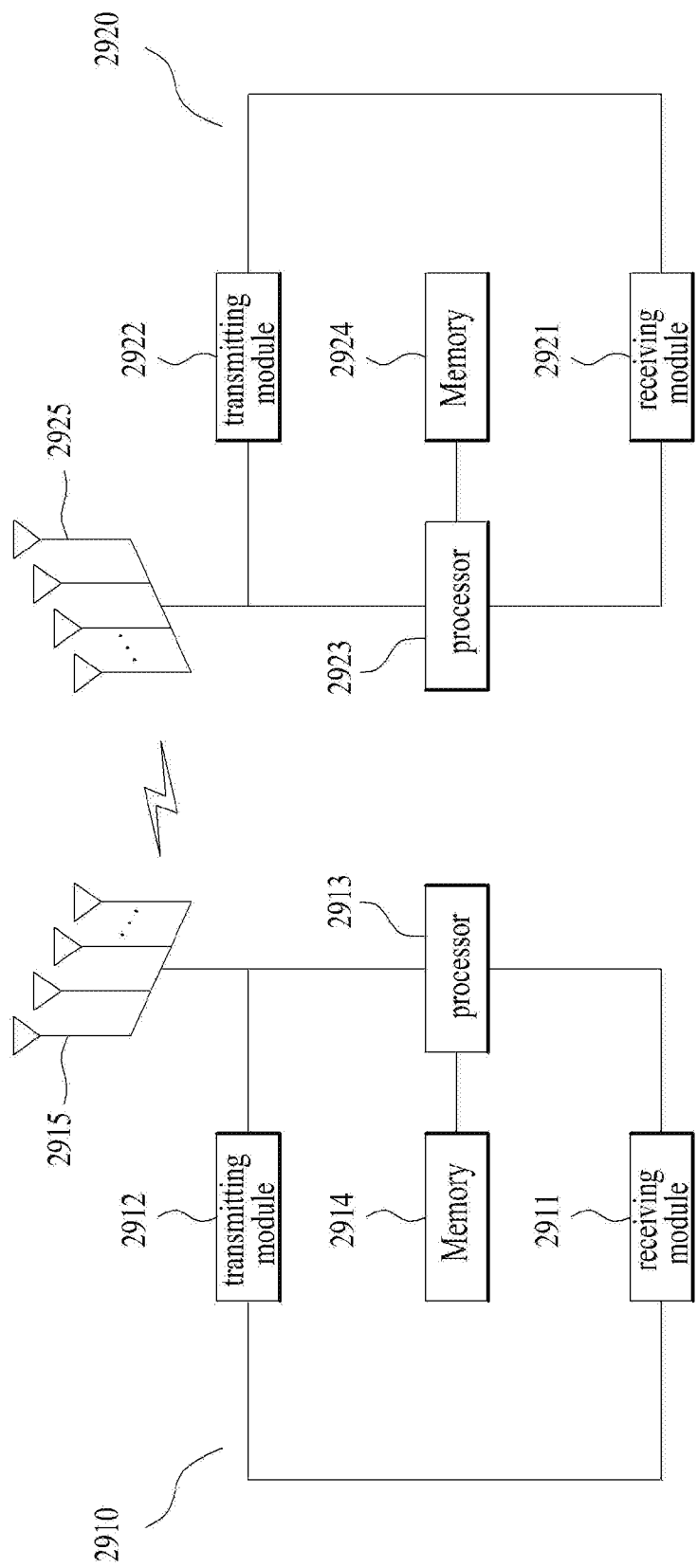
FIG. 29 is a block diagram illustrating configurations of a base station device and a user equipment device according to the present invention.

FIG. 29 is a diagram for configurations of a base station device and a user equipment device according to the present invention.

Referring to FIG. 29, a base station device 2910 according to the present invention may include a receiving module 2911, a transmitting module 2912, a processor 2913, a memory 2914 and a plurality of antennas 2915. In this case, a plurality of the antennas 2915 may mean a base station device that supports MIMO transmission and reception. The receiving module 2911 may receive various signals, data, information and the like in uplink from a user equipment.

The transmitting module 2912 may transmit various signals, data, information and the like in downlink to the user equipment. Moreover, the processor 2913 may be configured to control overall operations of the base station device 2910.

The base station device 2910 according to one embodiment of the present invention may be configured to transmit a DL signal. And, the memory 2914 of the base station device 2910 may store codebook including precoding matrixes. The processor 2913 of the base station device 2910 may be configured to receive 1st PMI (precoding matrix indicator) and 2nd PMI from the user equipment through the receiving module 2911. The processor 2913 may be configured to determine a 1st matrix (W1) from 1st codebook including the precoding matrixes indicated by the 1st PMI and determine a 2nd matrix (W2) from 2nd codebook including the precoding matrixes indicated by the 2nd PMI. The processor 2913 may be configured to determine a precoding matrix (W) based on the 1st matrix (W1) and the 2nd matrix (W2). The processor 2913 may be configured to perform precoding on at least one layer, to which the DL signal is mapped, using the determined precoding matrix (W). The processor 2913 may be configured to transmit the precoded signal to the user equipment through the transmitting module 2912. In this case, each of the precoding matrixes included in the 1st codebook includes a block diagonal matrix. And, one block may have a form multiplied by a prescribed phase value, which is different from a different block.

The processor 2913 of the base station device 2910 performs a function of processing information received by the base station device 2910, information to be externally transmitted and the like. The memory 2914 may store the processed information and the like for prescribed duration and be substituted with such a component as a buffer (not shown in the drawing) or the like.

Referring to FIG. 29, a user equipment device 2920 according to the present invention may include a receiving module 2921, a transmitting module 2922, a processor 2923, a memory 2924 and a plurality of antennas 2925. In this case, a plurality of the antennas 2925 may mean a user equipment device that supports MIMO transmission and reception. The receiving module 2921 may receive various signals, data, information and the like in downlink from a base station. The transmitting module 2922 may transmit various signals, data, information and the like in uplink to the base station. Moreover, the processor 2923 may be configured to control overall operations of the user equipment device 2920.

The user equipment device 2920 according to one embodiment of the present invention may be configured to receive and process a DL signal. And, the memory 2924 of the user equipment device 2920 may store codebook including precoding matrixes. The processor 2923 of the user equipment device 2920 may be configured to transmit 1st PMI (precoding matrix indicator) and 2nd PMI to the base station through the transmitting module 2922. The processor 2923 may be configured to receive the DL signal through the receiving module 2921. In this case, the DL signal received by the user equipment corresponds to the DL signal precoded by the base station using the precoding matrix (W). In particular, the precoding may be performed by the base station on at least one layer to which the DL signal is mapped. In this case, the precoding matrix (W) may be determined based on the 1st matrix (W1) determined from the 1st codebook including the precoding matrixes indicated by the 1st PMI and the 2nd matrix (W2) determined from the 2nd codebook including the precoding matrixes indicated by the 2nd PMI. The processor 2913 may be configured to determine a precoding matrix (W) based on the 1st matrix (W1) and the 2nd matrix (W2). The processor 2913 may be configured to process the received DL signal using the determined precoding matrix (W). In this case, each of the precoding matrixes included in the 1st codebook includes a block diagonal matrix. And, one block may have a form multiplied by a prescribed phase value, which is different from a different block.

The processor 2923 of the user equipment device 2920 performs a function of processing information received by the user equipment device 2920, information to be externally transmitted and the like. The memory 2924 may store the processed information and the like for prescribed duration and be substituted with such a component as a buffer (not shown in the drawing) or the like.

The detailed configurations of the base station device and the user equipment device mentioned in the above description may be implemented in a manner that the matters of various embodiments of the present invention mentioned in the foregoing description are independently applied or that at least two embodiments of the present invention are simultaneously applied. And, redundant contents may be omitted for clarity.

In the description with reference to FIG. 29, the description of the base station device 2910 may be identically applicable to a relay device as a downlink transmission entity or an uplink reception entity. And, the description of the user equipment device 2920 may be identically applicable to a relay device as a downlink reception entity or an uplink transmission entity.

The embodiments of the present invention may be implemented using various means. For instance, the embodiments of the present invention may be implemented using hardware, firmware, software and/or any combinations thereof.

In case of the implementation by hardware, a method according to each embodiment of the present invention may be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code may be stored in a memory unit and may be then drivable by a processor. The memory unit may be provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

The present invention may be embodied in other specific forms without departing from the spirit and essential characteristics of the invention. Thus, the above embodiments should be considered in all respects as exemplary and not restrictive. The scope of the present invention should be determined by reasonable interpretation of the appended claims and the present invention covers the modifications and variations of this invention that come within the scope of the appended claims and their equivalents. The present invention is non-limited by the embodiments disclosed herein but intends to give a broadest scope matching the principles and new features disclosed herein. And, it is apparently understandable that an embodiment is configured by combining claims failing to have relation of explicit citation in the appended claims together or can be included as new claims by amendment after filing an application.

INDUSTRIAL APPLICABILITY

Although a method and apparatus for transmitting a reference signal in a wireless communication system supporting multiple antennas are mainly described with reference to the examples of applying to 3GPP LTE system, as mentioned in the foregoing description, the present invention is applicable to various kinds of wireless communication systems as well as to the 3GPP LTE system.

What is claimed is:

1. A method of estimating a channel by a user equipment in a wireless communication system supporting multiple antennas, the method comprising:
receiving a CSI-RS (channel state information-reference signal) for a plurality of first domain antennas and a CRS (cell-specific reference signal) for a plurality of second domain antennas; and
estimating entire channels based on a first channel for the plurality of the first domain antennas estimated from the CSI-RS and a second channel for the plurality of the second domain antennas estimated from the CRS;
wherein, when the plurality of the first domain antennas are vertical domain antennas, the plurality of the second domain antennas are horizontal domain antennas and wherein, when the plurality of the first domain antennas are the horizontal domain antennas, the plurality of the second domain antennas are the vertical domain antennas.

2. The method of claim 1, wherein the entire channels are determined by Kronecker product of the first channel and the second channel.

3. The method of claim 1, wherein the CSI-RS and the CRS are configured through RRC (radio resource control) signaling.

4. The method of claim 1, wherein the CRS comprises a CRS quasi co-located with the CSI-RS.

5. The method of claim 1, wherein the CRS comprises a CRS of a serving cell.

6. The method of claim 1, further comprising feeding back channel state information on the entire channels to a base station.

7. A method of estimating a channel by a user equipment in a wireless communication system supporting multiple antennas, the method comprising:
receiving a CSI-RS (channel state information-reference signal) for a plurality of vertical antennas and first horizontal antennas and a CRS (cell-specific reference signal) for second horizontal antennas; and
estimating entire channels based on a vertical antenna channel estimated from the CSI-RS and a horizontal antenna channel estimated from the CSI-RS and the CRS.

8. The method of claim 7, wherein the entire channels are determined by Kronecker product of the vertical antenna channel and the horizontal antenna channel.

9. A user equipment for performing channel estimation in a wireless communication system supporting multiple antennas, comprising:
a radio frequency unit; and
a processor,
wherein the processor is configured to receive a CSI-RS (channel state information-reference signal) for a plurality of first domain antennas and a CRS (cell-specific reference signal) for a plurality of second domain antennas and estimate entire channels based on a first channel for the plurality of the first domain antennas estimated from the CSI-RS and a second channel for the plurality of the second domain antennas estimated from the CRS,
wherein, when the plurality of the first domain antennas are vertical domain antennas, the plurality of the second domain antennas are horizontal domain antennas and wherein, when the plurality of the first domain antennas are the horizontal domain antennas, the plurality of the second domain antennas are the vertical domain antennas.

* * * * *